United States Patent
Ryu et al.

(10) Patent No.: US 11,419,060 B2
(45) Date of Patent: Aug. 16, 2022

(54) UPLINK POWER CONTROL VIA MAC-CE MESSAGING

(71) Applicant: QUALCOMM Incorporated, San Diego, CA (US)

(72) Inventors: Jung Ho Ryu, Fort Lee, NJ (US); Yan Zhou, San Diego, CA (US); Kiran Venugopal, Raritan, NJ (US); Tianyang Bai, Somerville, NJ (US); Junyi Li, Chester, NJ (US); Tao Luo, San Diego, CA (US)

(73) Assignee: QUALCOMM incorporated, San Diego, CA (US)

( * ) Notice: Subject to any disclaimer, the term of this patent is extended or adjusted under 35 U.S.C. 154(b) by 70 days.

(21) Appl. No.: 16/996,071

(22) Filed: Aug. 18, 2020

(65) Prior Publication Data

US 2021/0058871 A1    Feb. 25, 2021

Related U.S. Application Data

(60) Provisional application No. 62/891,095, filed on Aug. 23, 2019.

(51) Int. Cl.
*H04W 52/34* (2009.01)
*H04W 52/14* (2009.01)
(Continued)

(52) U.S. Cl.
CPC ......... *H04W 52/146* (2013.01); *H04L 5/0051* (2013.01); *H04L 25/0226* (2013.01);
(Continued)

(58) Field of Classification Search
CPC ... H04W 52/228; H04W 52/10; H04W 52/18; H04W 52/08; H04W 52/146; H04W 52/04; H04W 52/221; H04W 52/242; H04W 16/28; H04W 52/32; H04W 52/34; H04W 48/12
See application file for complete search history.

(56) References Cited

U.S. PATENT DOCUMENTS

2021/0029649 A1* 1/2021 Cirik ................. H04W 52/0212

OTHER PUBLICATIONS

International Search Report and Written Opinion—PCT/US2020/046990—ISA/EPO—dated Nov. 9, 2020.
(Continued)

*Primary Examiner* — Tu X Nguyen
(74) *Attorney, Agent, or Firm* — Danai Nelisile Mhembere; Holland & Hart LLP

(57) ABSTRACT

Methods, systems, and devices for wireless communications are described. Techniques described herein may provide power control configuration parameters using MAC-CE messaging. A base station may transmit a MAC-CE message that includes a power control configuration identifier. The UE may identify a power control configuration according to the power control configuration identifier. The power control
(Continued)

configuration may include one or more power control parameters and a path loss reference signal identifier. The UE may update the path loss reference signal for an uplink transmission based on the received MAC-CE message and adjust power for performance of the uplink transmission according to one or more measurements of the updated path loss reference signal.

31 Claims, 18 Drawing Sheets

(51) Int. Cl.
    *H04W 80/02*         (2009.01)
    *H04W 52/24*         (2009.01)
    *H04W 52/32*         (2009.01)
    *H04W 52/08*         (2009.01)
    *H04L 25/02*         (2006.01)
    *H04L 5/00*          (2006.01)
    *H04W 52/42*         (2009.01)
    *H04W 56/00*         (2009.01)

(52) U.S. Cl.
    CPC ......... *H04W 52/08* (2013.01); *H04W 52/242* (2013.01); *H04W 52/248* (2013.01); *H04W 52/325* (2013.01); *H04W 52/42* (2013.01); *H04W 56/001* (2013.01); *H04W 80/02* (2013.01)

(56) References Cited

OTHER PUBLICATIONS

Samsung: "CR to 38.213 Capturing the RAN1#94bis and RAN1#95 Meeting Agreements", R1-1814394, 3GPP TSG RAN WG1 Meeting #95, Nov. 16, 2018 (Nov. 16, 2018), XP051489780, 91 pages, Retrieved from the Internet: URL: http://www.3gpp.org/ftp/3guinternal/3GPP%5FUltimate%5FCRPacks/RP%2D182523%2Ezip. [retrieved on Dec. 1, 2018] section 7.1.1; p. 19, section 7.3; p. 26.

Zte et al., "Remaining Details on NR Power Control in Non-CA Aspects", 3GPP Draft; R1-1800118 Remaining Details on NR Power Control in Non-CA Aspects, 3rd Generation Partnership Project (3GPP), Mobile Competence Centre; 650, Route Des Lucioles; F-06921 Sophia-Anti Polls Cedex; France, vol. RAN WG1, No. Vancouver, Canada; Jan. 22, 2018-Jan. 13, 2018, XP051384613, Retrieved from the Internet: URL:http://www.3gpp.org/ftp/tsg%5Fran/WG1%5FRL1/TSGR1%5FAH/NR%5FAH%5F1801/Docs/ [retrieved on Jan. 13, 2018], 18 pages.

\* cited by examiner

MAC-CE 305

Reference Signal 310

Uplink Transmission 315

UPLINK POWER CONTROL VIA MAC-CE MESSAGING

CROSS REFERENCE

The present Applications for patent claims the benefit of U.S. Provisional Patent Application No. 62/891,095 by RYU et al., entitled "UPLINK POWER CONTROL VIA MAC-CE MESSAGING," filed Aug. 23, 2019, assigned to the assignee hereof, and expressly incorporated by reference herein.

FIELD OF TECHNOLOGY

The following relates generally to wireless communications and more specifically to uplink power control via MAC-CE messaging.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In NR wireless communications systems, devices such as base stations and UEs may operate in high mobility environments. For example, a base station may communicate with multiple vehicles, which may be moving about a coverage area of the base station. As a UE moves about a coverage area of the base station, the base station and the UE may utilize a variety of different communication channels (e.g., beam pairs and time/frequency resources). In some cases, measuring a path loss of different communication channels may be challenging, such as in high mobility scenarios.

SUMMARY

The described techniques relate to improved methods, systems, devices, and apparatuses for managing uplink power control. Generally, the described techniques provide for receiving, at a UE, a medium access control layer control element (MAC-CE) message including a power control configuration identifier. In some examples, a base station may detect a power of an uplink message from the UE or detect a beam switch on a communication channel between the base station and the UE and transmit the MAC-CE message in response. The UE may identify a power control configuration based at least in part on the power control configuration identifier. The power control configuration may indicate one or more power control parameters and a path loss reference signal identifier. The UE may update a path loss reference signal for an uplink transmission from a first reference signal to a second reference signal based at least in part on the identified power control configuration. Accordingly, the UE may use the second reference signal for path loss estimation and power control adjustment in accordance with the MAC-CE message received from the base station.

A method of wireless communications at a UE is described. The method may include receiving a medium access control layer control element message including a power control configuration identifier, identifying a power control configuration based on the power control configuration identifier, where the power control configuration indicates one or more power control parameters and a path loss reference signal identifier, and updating a path loss reference signal for an uplink transmission from a first reference signal to a second reference signal based on the identified power control configuration.

An apparatus for wireless communications at a UE is described. The apparatus may include a processor, memory coupled with the processor, and instructions stored in the memory. The instructions may be executable by the processor to cause the apparatus to receive a medium access control layer control element message including a power control configuration identifier, identify a power control configuration based on the power control configuration identifier, where the power control configuration indicates one or more power control parameters and a path loss reference signal identifier, and update a path loss reference signal for an uplink transmission from a first reference signal to a second reference signal based on the identified power control configuration.

Another apparatus for wireless communications at a UE is described. The apparatus may include means for receiving a medium access control layer control element message including a power control configuration identifier, identifying a power control configuration based on the power control configuration identifier, where the power control configuration indicates one or more power control parameters and a path loss reference signal identifier, and updating a path loss reference signal for an uplink transmission from a first reference signal to a second reference signal based on the identified power control configuration.

A non-transitory computer-readable medium storing code for wireless communications at a UE is described. The code may include instructions executable by a processor to receive a medium access control layer control element message including a power control configuration identifier, identify a power control configuration based on the power control configuration identifier, where the power control configuration indicates one or more power control parameters and a path loss reference signal identifier, and update a path loss reference signal for an uplink transmission from a first reference signal to a second reference signal based on the identified power control configuration.

Some examples of the method, apparatuses, and non-transitory computer-readable medium described herein may further include operations, features, means, or instructions for receiving a downlink communication including the second reference signal, performing one or more measurements of the second reference signal to identify a path loss, and adjusting (or configuring a transmitter for adjusting) a transmission power for the uplink transmission based on the identified path loss.

Some examples of the method, apparatuses, and non-transitory computer-readable medium described herein may further include operations, features, means, or instructions for receiving a sequence of power control configuration identifiers in the medium access control layer control element message.

Some examples of the method, apparatuses, and non-transitory computer-readable medium described herein may further include operations, features, means, or instructions for updating the path loss reference signal from the second reference signal to a third reference signal based on the sequence of power control configuration identifiers.

In some examples of the method, apparatuses, and non-transitory computer-readable medium described herein, updating the path loss reference signal from the second reference signal to the third reference signal further may include operations, features, means, or instructions for updating the path loss reference signal from the second reference signal to the third reference signal after expiration of a period of time.

In some examples of the method, apparatuses, and non-transitory computer-readable medium described herein, the medium access control layer control element message indicates a duration of the period of time.

Some examples of the method, apparatuses, and non-transitory computer-readable medium described herein may further include operations, features, means, or instructions for performing the uplink transmission using one or more transmit beams, a millimeter wave frequency, or a combination thereof.

Some examples of the method, apparatuses, and non-transitory computer-readable medium described herein may further include operations, features, means, or instructions for receiving, from a base station, an indication of a value for at least one of the one or more power control parameters for a set of power control configuration identifiers.

In some examples of the method, apparatuses, and non-transitory computer-readable medium described herein, the power control configuration identifier indicates a physical uplink shared channel configuration.

In some examples of the method, apparatuses, and non-transitory computer-readable medium described herein, the power control configuration identifier indicates a sounding reference signal resource set configuration.

In some examples of the method, apparatuses, and non-transitory computer-readable medium described herein, the power control configuration identifier indicates a physical uplink control channel spatial relation information configuration.

In some examples of the method, apparatuses, and non-transitory computer-readable medium described herein, the one or more power control parameters include a closed loop index, an alpha set identifier, or a combination thereof.

In some examples of the method, apparatuses, and non-transitory computer-readable medium described herein, the path loss reference signal identifier specifies a synchronization signal block including the second reference signal.

A method of wireless communications at a base station is described. The method may include receiving, from a UE, a first uplink transmission having a first received power, determining to update a path loss reference signal for the UE from a first reference signal to a second reference signal based on the first received power, and transmitting a medium access control layer control element message to the UE, where the medium access control layer control element message includes a power control configuration identifier that indicates one or more power control parameters and a path loss reference signal identifier for the second reference signal.

An apparatus for wireless communications at a base station is described. The apparatus may include a processor, memory coupled with the processor, and instructions stored in the memory. The instructions may be executable by the processor to cause the apparatus to receive, from a UE, a first uplink transmission having a first received power, determine to update a path loss reference signal for the UE from a first reference signal to a second reference signal based on the first received power, and transmit a medium access control layer control element message to the UE, where the medium access control layer control element message includes a power control configuration identifier that indicates one or more power control parameters and a path loss reference signal identifier for the second reference signal.

Another apparatus for wireless communications at a base station is described. The apparatus may include means for receiving, from a UE, a first uplink transmission having a first received power, determining to update a path loss reference signal for the UE from a first reference signal to a second reference signal based on the first received power, and transmitting a medium access control layer control element message to the UE, where the medium access control layer control element message includes a power control configuration identifier that indicates one or more power control parameters and a path loss reference signal identifier for the second reference signal.

A non-transitory computer-readable medium storing code for wireless communications at a base station is described. The code may include instructions executable by a processor to receive, from a UE, a first uplink transmission having a first received power, determine to update a path loss reference signal for the UE from a first reference signal to a second reference signal based on the first received power, and transmit a medium access control layer control element message to the UE, where the medium access control layer control element message includes a power control configuration identifier that indicates one or more power control parameters and a path loss reference signal identifier for the second reference signal.

Some examples of the method, apparatuses, and non-transitory computer-readable medium described herein may further include operations, features, means, or instructions for transmitting a downlink communication including the second reference signal.

Some examples of the method, apparatuses, and non-transitory computer-readable medium described herein may further include operations, features, means, or instructions for receiving, from the UE, a second uplink transmission having a second received power different from the first received power.

Some examples of the method, apparatuses, and non-transitory computer-readable medium described herein may further include operations, features, means, or instructions for transmitting a sequence of power control configuration identifiers in the medium access control layer control element message.

Some examples of the method, apparatuses, and non-transitory computer-readable medium described herein may further include operations, features, means, or instructions for transmitting a duration of a period of time for updating, by the UE, the path loss reference signal from the second reference signal to a third reference signal after expiration of the period of time, where the duration may be transmitted in the medium access control layer control element message.

Some examples of the method, apparatuses, and non-transitory computer-readable medium described herein may further include operations, features, means, or instructions for receiving, from the UE, an uplink transmission using one or more receive beams, a millimeter wave frequency, or a combination thereof.

Some examples of the method, apparatuses, and non-transitory computer-readable medium described herein may further include operations, features, means, or instructions for transmitting, to the UE, an indication of a value for at least one of the one or more power control parameters for a set of power control configuration identifiers.

In some examples of the method, apparatuses, and non-transitory computer-readable medium described herein, the power control configuration identifier indicates a physical uplink shared channel configuration.

In some examples of the method, apparatuses, and non-transitory computer-readable medium described herein, the power control configuration identifier indicates a sounding reference signal resource set configuration.

In some examples of the method, apparatuses, and non-transitory computer-readable medium described herein, the power control configuration identifier indicates a physical uplink control channel spatial relation information configuration.

In some examples of the method, apparatuses, and non-transitory computer-readable medium described herein, the one or more power control parameters include a closed loop index, an alpha set identifier, or a combination thereof.

In some examples of the method, apparatuses, and non-transitory computer-readable medium described herein, the path loss reference signal identifier specifies a synchronization signal block including the second reference signal.

DETAILED DESCRIPTION

Figure 1:
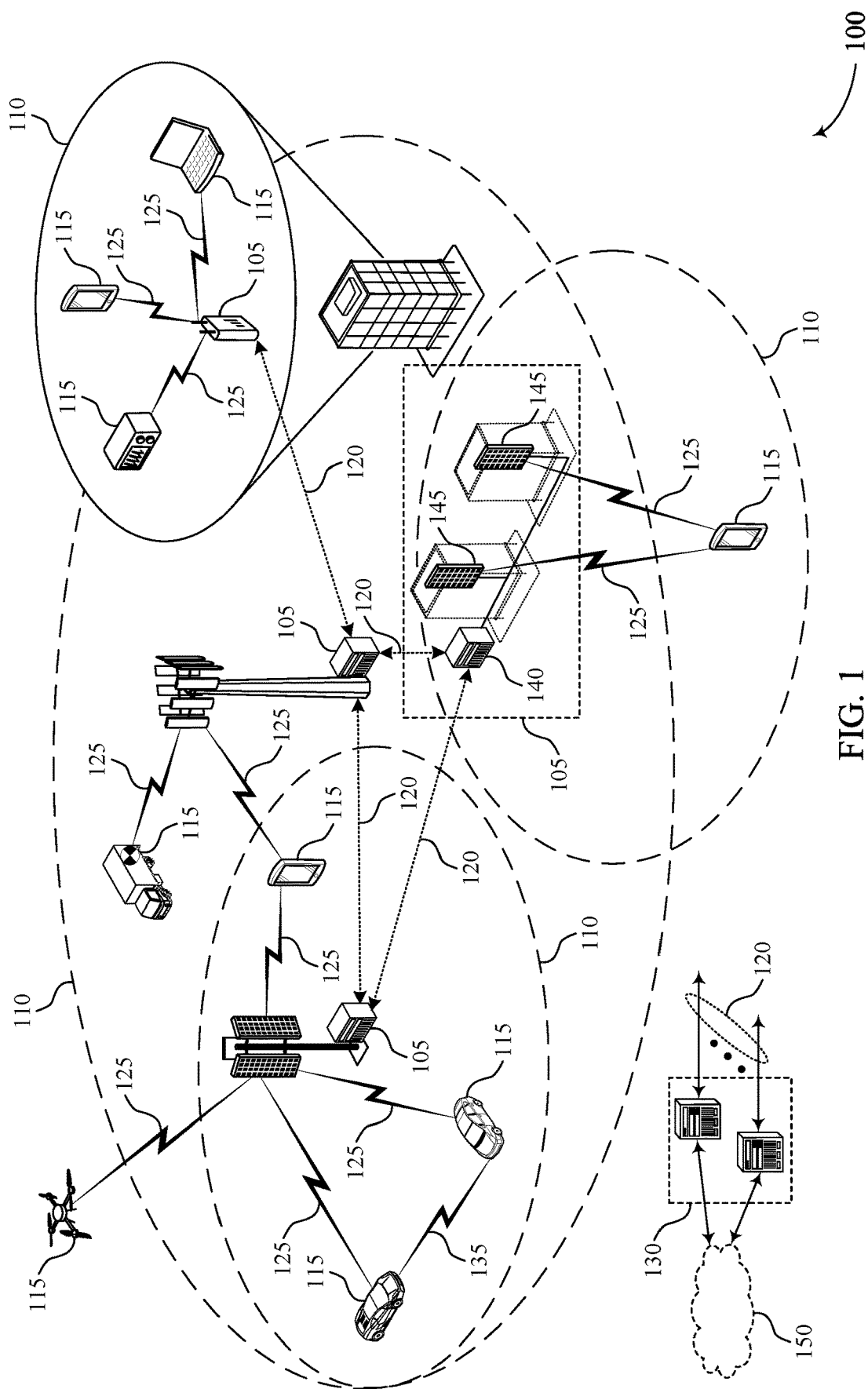
FIG. 1 illustrates an example of a system for wireless communications in accordance with aspects of the present disclosure.

In NR wireless communications systems, devices such as base stations and user equipments (UEs) may operate in high mobility environments. For example, a base station may communicate with multiple vehicles, which may be moving about a coverage area of the base station. As a UE moves about a coverage area of the base station, the base station and the UE may utilize a variety of different communication channels (e.g., beam pairs and time/frequency resources). A UE may measure a path loss reference signal in each channel to determine power control adjustments. Due to the high mobility of the UEs, the UEs may need to be frequently informed of the reference signal (e.g., a path loss reference signal) to measure for power adjustments.

In some cases, the base station may transmit a radio resource control (RRC) message to the UE to inform the UE of the reference signal and other power control configuration parameters to use for power control. However, RRC messaging may utilize large transmission payloads (e.g., some or all of the power configuration parameters may be explicitly carried in the RRC message). As such, frequent RRC messaging to update UE power control parameters may utilize significant communication resources, which may affect latency and reliability of the wireless communications system.

Techniques described herein may provide power control configuration parameters using MAC-CE messaging. A MAC-CE message may have a smaller payload than a RRC message. Accordingly, when a base station detects a condition that may entail an update to a path loss reference signal that a UE may use to perform power adjustments, the base station may transmit a MAC-CE message that includes an indication of a path loss reference signal and one or more power control parameters. For example, the base station may receive an uplink message with a high or low received power, or the base station may detect a beam switch of one or more beams used by the base station and the UE. In response to the detected power or the beam switch, the base station may transmit the MAC-CE message with an indication of power control configuration parameters to the UE (as opposed to signaling some or all of the power control configuration parameters explicitly as in RRC signaling). The UE may update the path loss reference signal for an uplink transmission based on the received MAC-CE message and adjust power for performance of the uplink transmission according to one or more measurements of the updated path loss reference signal. Accordingly, the UE may be able to perform power control adjustments in response to a MAC-CE message, which may utilize fewer resources than a RRC message. Thus, the UE and the wireless communications system may operate more efficiently and reliably.

Particular aspects of the subject matter described herein may be implemented to realize one or more advantages. The described techniques may support improvements in power control configuration signaling, decreasing signaling overhead, and improving reliability, among other advantages. As such, supported techniques may include improved network operations and, in some examples, may promote network efficiencies, among other benefits. Aspects of the disclosure are initially described in the context of a wireless communications system. Aspects of the disclosure are further described with respect to wireless communications systems and a process flow diagram. Aspects of the disclosure are further illustrated by and described with reference to apparatus diagrams, system diagrams, and flowcharts that relate to uplink power control via MAC-CE messaging.

FIG. 1 illustrates an example of a wireless communications system 100 in accordance with aspects of the present disclosure. The wireless communications system 100 may include base stations 105, UEs 115, and a core network 130.

In some examples, the wireless communications system 100 may be a Long Term Evolution (LTE) network, an LTE-Advanced (LTE-A) network, an LTE-A Pro network, or a New Radio (NR) network. In some cases, the wireless communications system 100 may support enhanced broadband communications, ultra-reliable (e.g., mission critical) communications, low latency communications, communications with low-cost and low-complexity devices, or any combination thereof.

Base stations 105 may be dispersed throughout a geographic area to form the wireless communications system 100 and may be devices in different forms or having different capabilities. Base stations 105 and UEs 115 may wirelessly communicate via one or more communication links 125. Each base station 105 may provide a coverage area 110 over which UEs 115 and the base station 105 may establish communication links 125. The coverage area 110 may be an example of a geographic area over which a base station 105 and a UE 115 support the communication of signals according to one or more radio access technologies.

UEs 115 may be dispersed throughout a coverage area 110 of the wireless communications system 100, and each UE 115 may be stationary, or mobile, or both at different times. UEs 115 may be devices in different forms or having different capabilities. Some example UEs 115 are illustrated in FIG. 1. The UEs 115 described herein may be able to communicate with various types of devices, such as other UEs 115, base stations 105, and/or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with the core network 130 through backhaul links 120 (e.g., via an S1, N2, N3, or other interface). Base stations 105 may communicate with one another over backhaul links 120 (e.g., via an X2, Xn, or other interface) either directly (e.g., directly between base stations 105), or indirectly (e.g., via core network 130), or both. In some examples, backhaul links 120 may be or include one or more wireless links.

One or more of base stations 105 described herein may include or may be referred to by a person of ordinary skill in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, a machine type communications (MTC) device, or the like, which may be implemented in various objects such as appliances, vehicles, meters, or the like.

The UEs 115 described herein may be able to communicate with various types of devices, such as other UEs 115 that may sometimes act as relays as well as base stations 105 and network equipment including macro eNBs or gNBs, small cell eNBs or gNBs, relay base stations, and the like, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting communication links 125. For example, a carrier used for a communication link 125 may include a portion of a radio frequency spectrum band (e.g., a bandwidth part (BWP)) that is operated according to physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 megahertz (MHz)). Devices of the wireless communications system 100 (e.g., base stations 105, UEs 115, or both) may have hardware configurations that support communications over a particular carrier bandwidth or may be configurable to support communications over one of a set of carrier bandwidths. In some examples, the wireless communications system 100 may include base stations 105 and/or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into BWPs having the same or different numerologies. In some examples, a UE 115 may be configured with multiple BWPs. In some cases, a single BWP for a carrier is active at a given time, and communications for the UE 115 may be restricted to active BWPs.

Time intervals for base stations 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some cases, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some cases, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or various combinations thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, exterior spaces between or overlapping with geographic coverage areas 110, or the like.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to UEs 115 with service subscriptions with the network provider or may provide restricted access to UEs 115 having an association with the small cell (e.g., UEs 115 in a closed subscriber group (CSG), UEs 115 associated with users in a home or office, and the like). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB), or others) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, overlapping geographic coverage areas 110 associated with different technologies may be supported by different base stations 105. The wireless communications system 100 may include, for example, a heterogeneous network in which different types of base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a predefined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some cases, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some cases, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), a user plane function (UPF)). The control plane entity may manage non-access stratum (NAS) functions such as mobility, authentication, and bearer management for UEs 115 served by base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with UEs 115 through a number of other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features, but the waves may penetrate structures sufficiently for a macro cell to provide service to UEs 115 located indoors. Transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between UEs 115 and base stations 105, and EHF antennas of the respective devices may be smaller and more closely spaced than UHF antennas. In some cases, this may facilitate use of antenna arrays within a device. The propagation of EHF transmissions, however, may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some cases, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, D2D transmissions, or the like.

A base station 105 or UE 115 may be equipped with multiple antennas, which may be used to employ techniques such as transmit diversity, receive diversity, multiple-input multiple-output (MIMO) communications, or beamforming. The antennas of a base station 105 or UE 115 may be located within one or more antenna arrays or antenna panels, which may support MIMO operations or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions and may report to the base station 105 an indication of the signal that the UE 115 received with a highest signal quality, or an otherwise acceptable signal quality.

In some cases, transmissions by a device (e.g., by a base station 105 or UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

UEs 115 and base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some cases, a device may support same-slot HARQ feedback, where the device may provide HARQ feedback in a specific slot for data received in a previous symbol in the slot. In other cases, the device may provide HARQ feedback in a subsequent slot, or according to some other time interval.

UEs 115 utilize power control procedures to perform power adjustments for uplink transmissions. In some cases, UE 115 may perform one or more measurements on a reference signal (e.g., a path loss reference signal) on a channel between the UE 115 and the base station 105. Based on the measurements, the UE 115 may estimate a path loss on the channel between the UE 115 and the base station 105 and adjust the transmission power for a subsequent uplink transmission based on the estimated path loss.

A base station 105 may configure the UEs 115 with power control configuration parameters for performing reference signal measurements and power adjustments. In some cases, the base station 105 may utilize RRC signaling to configure the UEs 115 with power control configuration. However, RRC signaling may involve high signaling overhead. Further, as UEs 115 may operate in high mobility environments, the UEs 115 may frequently change channels for communicating with a base station 105, and new channels may result in new reference signals for reference signal measurements. As such, frequent RRC signaling for mobile UEs 115 may utilize significant communication resources in the wireless communications system 100 and computing resources at the UEs 115.

Accordingly, the techniques described herein may provide for power control configurations via MAC-CE messaging. In some cases, a base station 105 may transmit a MAC-CE message to a UE 115, and the MAC-CE message may include an indication of a power control configuration. The power control configuration may include an indication of a path loss reference signal and one or more power control parameters. The UE 115 may be configured with plurality of power control configurations, and the MAC-CE may indicate an index of one of the plurality of power control configurations. Accordingly, rather than utilize RRC with a payload indicating a plurality of power control parameters, the MAC-CE message may indicate the parameters using a power control identifier. The UE 115 may update and measure a reference signal indicated via the MAC-CE message and perform power control adjustments based on the measurements.

Figure 2:
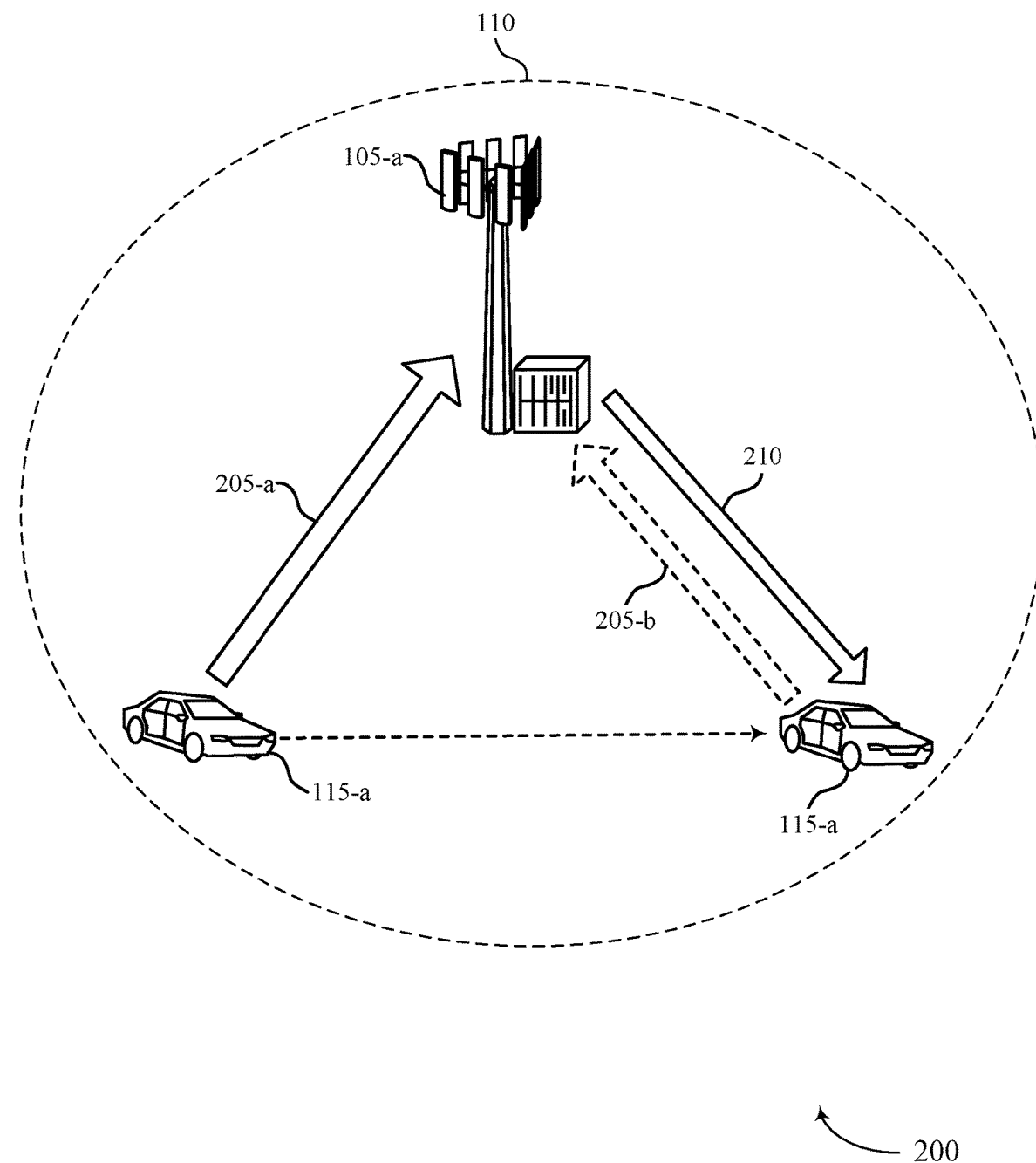
FIG. 2 illustrates an example of a wireless communications system in accordance with aspects of the present disclosure.

FIG. 2 illustrates an example of a wireless communications system 200 in accordance with aspects of the present disclosure. In some examples, wireless communications system 200 may implement aspects of wireless communications system 100. The wireless communications system 200 includes a base station 105-*a* and a UE 115-*a*, which may be examples of the corresponding devices of FIG. 1. In FIG. 2, UE 115-*a* is illustrated as a vehicle, but it should be understood that the UE 115-*a* may be a mobile device, a train, or other type of UE 115 as described herein.

The UE 115-*a* and the base station 105-*a* may communicate over one or more wireless communication channels. In some cases, the UE 115-*a* may periodically or aperiodically determine a path loss on the one or more channels for uplink transmission power control. For example, the UE 115-*a* may be geographically located at a first position within a coverage area 110 of the base station 105-*a*. The UE 115-*a* may transmit a first uplink transmission 205-*a* from the first position, and the first transmission may be transmitted in accordance with a first transmission power determined based on one or more measurements of a reference signal (e.g., a path loss reference signal).

The UE 115-*a* may travel from the first location to a second location within the geographic coverage area 110. The change in location may cause changes in a beam used to communicate over the communication channel, changes in path loss on the channel, etc. For example, the UE 115-*a* may transmit the second uplink transmission 205-*b* with a second transmission power based on one or more measurements of a path loss reference signal. In some cases, the transmission power of the second uplink transmission 205-*b* may be determined based on measurements of the same reference signal used to transmit the first uplink transmission 205-*a*. However, due to the change in location of the UE 115-*a*, the channel (e.g., beams and/or time/frequency resources) used to communicate between the base station 105-*a* and the UE 115-*a* may change. As such, the reference signal for the channel used to transmit the first uplink transmission 205-*a* may not provide an adequate basis for determining that the transmission power for the second transmission 205-*b* on another channel. Accordingly, the base station 105-*a* may not be able to decode the uplink transmission 205-*b* due to the transmission power being too low or the uplink transmission 205-*b* may cause interference with other uplink transmissions due to the transmission power being too high.

Accordingly, the base station 105-*a* may transmit a MAC-CE message 210, and the MAC-CE message may include a power control configuration identifier. The power control configuration identifier may correspond to a power control configuration stored at the UE 115-*a*. In some cases, the base station 105-*a* configures a plurality of power control configurations at the UE 115-*a*. Each power control configuration may be identified using an identifier (e.g., an index) and may include values for various parameters such as an alpha set identifier, closed loop index, etc. The power control configuration may also include an identifier for a path loss reference signal.

The power control configurations may be in the form of a physical uplink shared channel (PUSCH) configuration for PUSCH uplink transmission power control, a sounding reference signal resource set configuration for sounding reference signal power control, and/or a physical uplink control channel (PUCCH) spatial relation information configuration for PUCCH uplink transmission power control. In the case of PUSCH configurations, power control configurations may be associated with different sounding reference signal resource indicators (SRIs), and the power control configuration identifier may be a SRI PUSCH power control identifier. In the case of sounding reference signal resource set configuration for sounding reference signal power control, the power control configurations may be associated with different sounding reference signal resource set identifiers, and the power control configuration identifier may be a sounding reference signal resource set identifier. In the case of PUCCH spatial relation information configuration for PUCCH uplink transmission power control, the power control configurations may be associated with different PUCCH spatial relation information identifiers, and the power control configuration identifier may be a PUCCH spatial relation information identifier.

The UE 115-*a* may perform power control according to the power control configuration indicated by the power control configuration identifier. This may include updating the reference signal used to estimate path loss from a first reference signal (according to the prior configuration) to a second reference signal (according to the identified configuration). The UE 115-*a* may perform one or more measurements on a received reference signal (e.g., the second reference signal), and transmit an uplink transmission 205 (e.g., a PUSCH transmission, a sounding reference signal transmission, or a PUCCH transmission) using a transmission power determined based on the estimated path loss (e.g., the measurements of the reference signal).

In some cases, the MAC-CE message 210 may indicate more than one power control configuration identifiers (e.g., a sequence of identifiers). In such cases, the MAC-CE message 210 may also include a time period. In other cases, the time period may be static. The UE 115-*a* may use a first power control configuration indicated by a first power control configuration identifier during the time period, then switch to a second power control configuration indicated by a second power control configuration identifier after expiration of the time period. This technique may be used when the UE 115-*a* travels along a predetermined path or track (e.g., trains/vehicles). As such, the base station 105-*a* may configure the series of power control configurations when the UE 115-*a* enters the coverage area 110.

In some cases, the UE 115-*a* may be configured with a plurality of power control configurations. For example, the base station 105-*b* may transmit a power control configuration template including fields for the power control parameters and reference signal identifier. The base station 105-*a* may configure a plurality of configurations using an indexing mechanism (e.g., identifying one of the configurations using an identifier). In some cases, the parameter values are the same for a plurality of the configurations, and the indexing mechanism may be used to efficiently fill the configurations and the corresponding parameter values at the UE 115-*a*.

Figure 3:
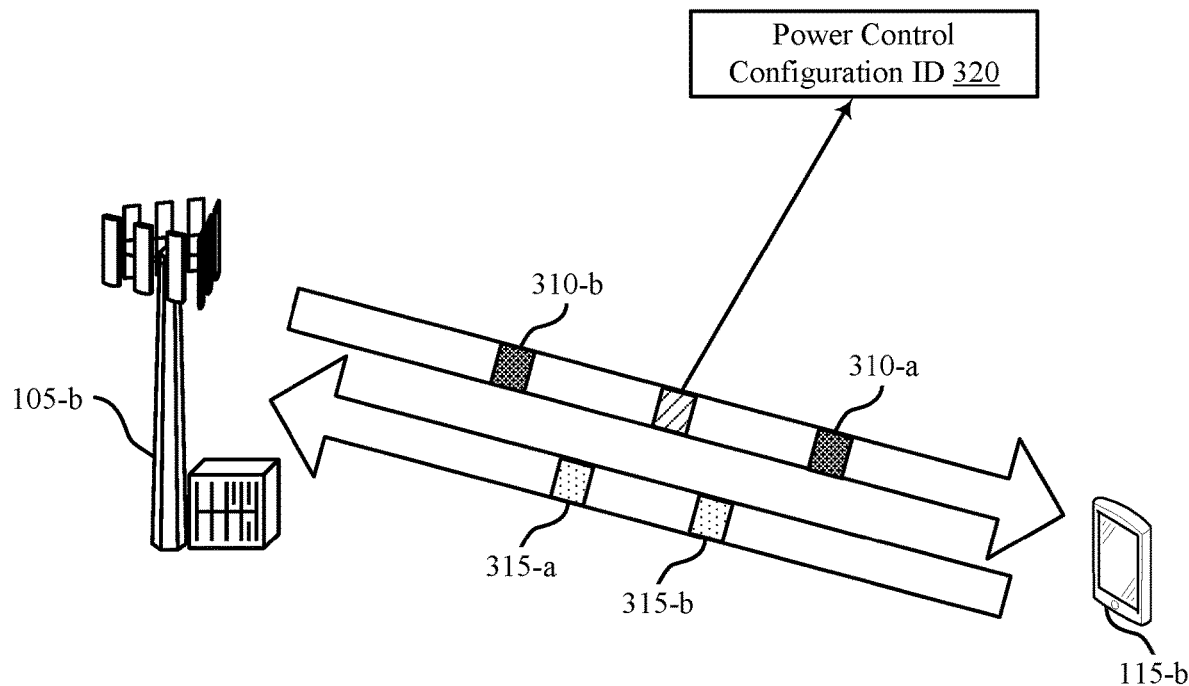
FIG. 3 illustrates an example of a wireless communications system in accordance with aspects of the present disclosure.
Figure 3:
Figure 3:
Figure 3:
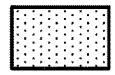

FIG. 3 illustrates an example of a wireless communications system 300 in accordance with aspects of the present disclosure. In some examples, wireless communications system 300 may implement aspects of wireless communications system 100. The wireless communications system 200 includes a base station 105-*b* and a UE 115-*b*, which may be examples of the corresponding devices of FIGS. 1 and 2.

The base station 105-*b* may transmit a first reference signal 310-*a* to the UE 115-*b*. The UE 115-*b* may perform one or more measurements of the first reference signal 310-*a* to estimate a path loss on a communication channel between the base station 105-*b* and the UE 115-*b*. Based on the estimated path loss, the UE 115-*b* may transmit a first uplink transmission 315-*a* with a first transmission power. The base station 105-*b* may transmit a MAC-CE message 305 to the UE 115-*b*. The MAC-CE message 305 may be transmitted based on the received power of the first uplink transmission 315-*a* or based on a change in the channel (e.g., beams and/or time/frequency resources). The MAC-CE message 305 may include at least a power control configuration identifier 320. Accordingly, the MAC-CE message 305 may include a field for the power control configuration identifier 320.

The UE 115-*b* may identify a power control configuration using the power control configuration identifier 320. For example, the power control configuration identifier is a SRI PUSCH power control identifier, a sounding reference signal resource set identifier, or a PUCCH spatial relation information identifier, and the UE 115-*b* identifies a power control configuration corresponding to one of these identifiers. The power control configuration may indicate one or more power control parameters (e.g., closed loop index, alpha set identifier, etc.) and a path loss reference signal identifier. The UE 115-*b* may perform power control based on the power control configuration. For example, the UE 115-*b* may update a path loss reference signal for an uplink transmission 315 from a first reference signal (e.g., the prior used reference signal) to a second reference signal indicated by the identified power control configuration. The UE 115-*b* may receive a second reference signal 310-*b* from the base station 105-*b*. The UE 115-*b* may perform power control techniques using the second reference signal 310-*b* and according to the identified power control configuration. For example, the UE 115-*b* performs one or more measurements on the second reference signal and determines power adjustments based on the measurements and for a second uplink transmission 315-*b*. The UE 115-*b* may transmit the second uplink transmission to the base station 105-*b* using a transmission power determined using the power control configuration.

In some cases, the MAC-CE message 305 may include more than one power control configuration identifier 320 (e.g., a series of power control configuration identifiers 320). The UE 115-*b* may use a first power control configuration indicated by a first power control configuration identifier during a time period, then switch to a second power control configuration indicated by a second power control configuration identifier after expiration of the time period. The time period may be indicated by the MAC-CE message 305 or may be determined according to a static configuration.

Figure 4:
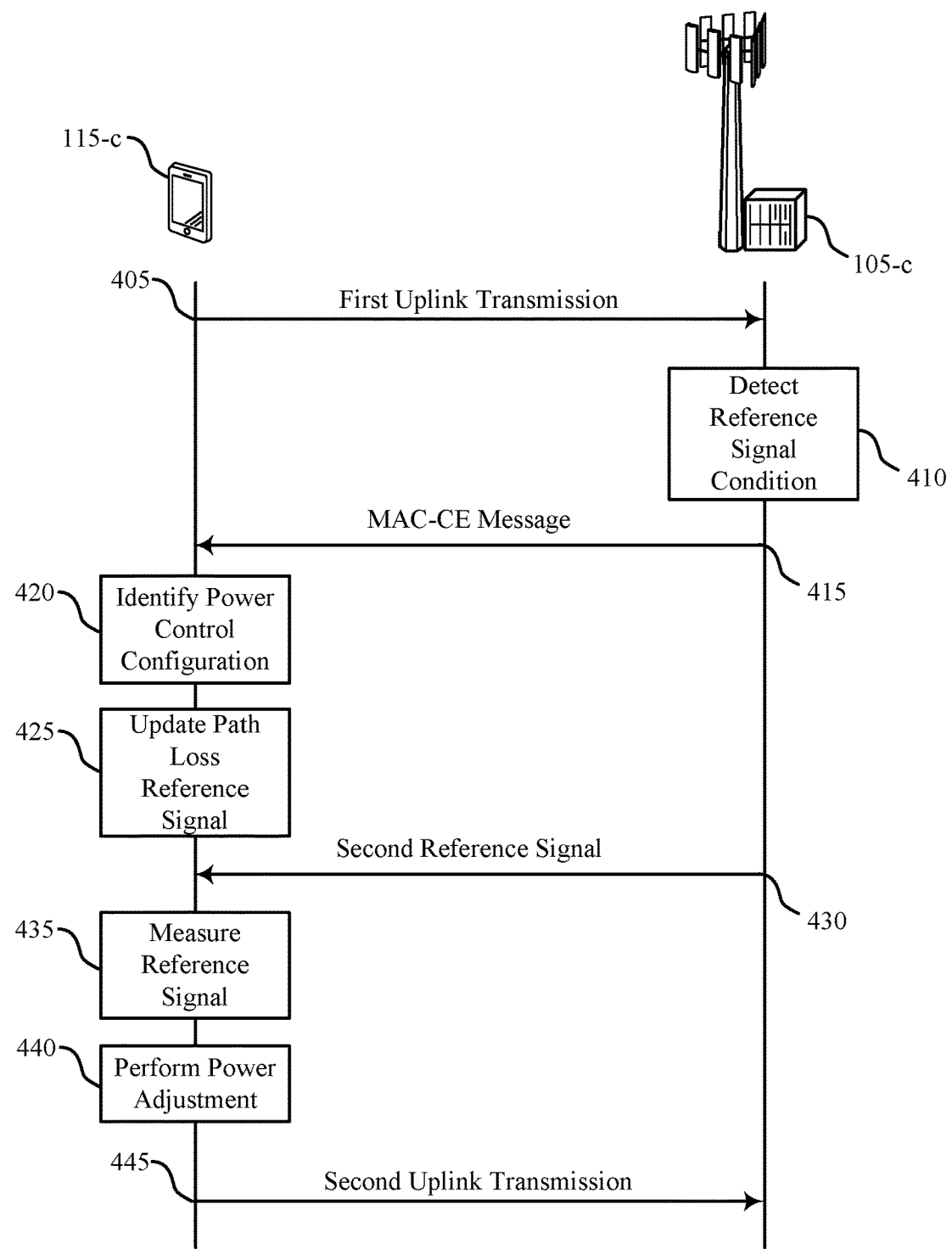
FIG. 4 illustrates an example of a process flow diagram in accordance with aspects of the present disclosure.

FIG. 4 illustrates an example of a process flow diagram 400 in accordance with aspects of the present disclosure. In some examples, process flow diagram 400 may implement aspects of wireless communications system 100. The process flow diagram 400 includes a base station 105-*c* and a UE 115-*c*, which may be examples of the corresponding devices of FIGS. 1 through 3. The UE 115-*c* may communicate uplink transmissions to the base station 105-*c* over an established communication channel. In some cases, the base station 105-*c* and the UE 115-*c* communicate using mmW radiofrequency spectrum and/or using beamforming techniques. The UE 115-*c* may be in a mobile environment. For example, the UE 115-*c* may be or may be within a vehicle or a train.

At 405, the UE 115-*c* may perform an uplink transmission with a first transmission power. The base station 105-*c* may receive the first uplink transmission with a received power. At 410, the base station 105-*c* may detect satisfaction of a reference signal condition. The reference signal condition may be based on the received power of the first uplink transmission and/or a beam switch between the base station 105-*c* and the UE 115-*c*. For example, the base station 105-*c* may determine that the received transmission power is too high/low to successfully decode the first uplink transmission and determine that the reference signal condition is satisfied.

At 415, the base station 105-*c* transmits a MAC-CE message to the UE 115-*c*. The MAC-CE message may include a power control configuration identifier. At 420, the UE 115-*c* may identify a power control configuration based at least in part on the power control configuration identifier. The power control configuration may indicate one or more power control parameters and a path loss reference signal identifier. In some cases, the power control configuration identifier indicates a physical uplink shared channel configuration. In some cases, the power control configuration identifier indicates a sounding reference signal resource set configuration. In some cases, the power control configuration identifier indicates a physical uplink control channel spatial relation information configuration. The configuration may include parameters that include a closed loop index, an alpha set identifier, as well as other power control configuration parameters.

At 425, the UE 115-*c* may update a path loss reference signal for an uplink transmission from a first reference signal to a second reference signal based at least in part on the identified power control configuration. The second reference signal may be indicated by the path loss reference signal identifier indicated by the power control configuration. In some cases, the MAC-CE message may include more than one power control configuration identifiers and a time period. Accordingly, the UE 115-*c* may use the power control configuration indicated by a first power control configuration identifier during the time period, and switch to the power control configuration indicated by the second power control configuration identifier after expiration of the time period. This process may occur for more than two identifiers received in the MAC-CE message.

At 430, the UE may receive the second reference signal from the base station 105-*c*. At 435, the UE 115-*c* may perform one or more measurements of the second reference signal to estimate a path loss. At 440, the UE 115-*c* may perform a power adjustment based at least in part on the estimated path loss. At 445, the UE 115-*c* may transmit a second uplink transmission with a transmission power determined according to the power adjustment and the estimated path loss.

Figure 5:
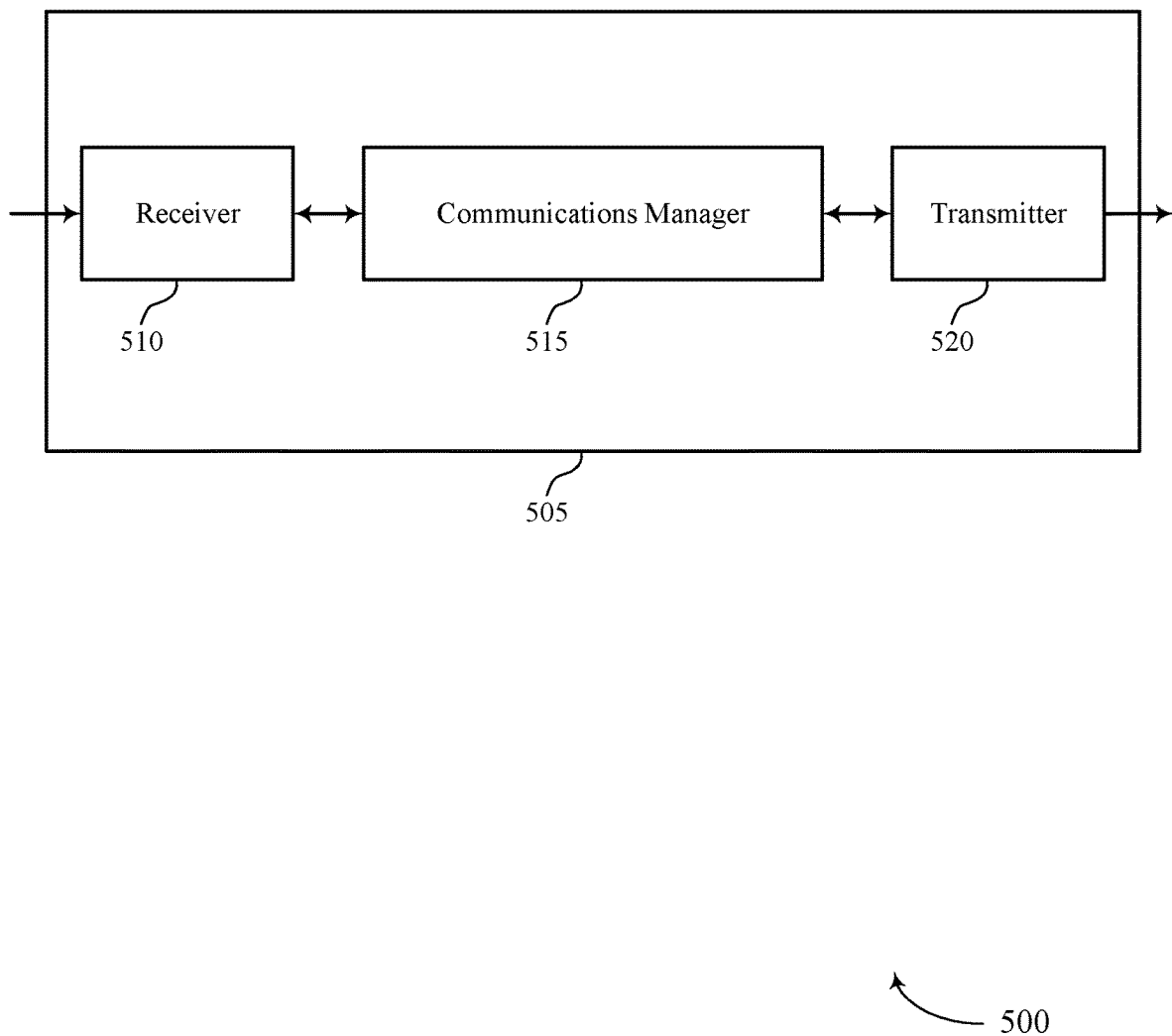
FIGS. 5 and 6 show block diagrams of devices in accordance with aspects of the present disclosure.

FIG. 5 shows a block diagram 500 of a device 505 in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to uplink power control via MAC-CE messaging, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive a medium access control layer control element message including a power control configuration identifier, identify a power control configuration based on the power control configuration identifier, where the power control configuration indicates one or more power control parameters and a path loss reference signal identifier, and update a path loss reference signal for an uplink transmission from a first reference signal to a second reference signal based on the identified power control configuration. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

In some examples, the communications manager 515 may be implemented as an integrated circuit or chipset for a mobile device modem, and the receiver 510 and transmitter 520 may be implemented as analog components (e.g., amplifiers, filters, antennas) coupled with the mobile device modem to enable wireless transmission and reception over one or more bands.

The communications manager 515 as described herein may be implemented to realize one or more potential advantages. One implementation may allow the device 505 to more efficiently receive power control configurations, and more specifically to identify a reference signal for use in power control procedures. For example, the device 505 may identify a configuration to use for power control operations based on received MAC-CE messages.

Based on implementing the power control configuration techniques as described herein, a processor of a UE 115 (e.g., controlling the receiver 510, the transmitter 520, or the transceiver 820 as described with reference to FIG. 8) may increase reliability and decrease signaling overhead in the communication of power control configuration because the power control configuration may not be explicitly indicated to the UE 115 (e.g., via RRC). Rather the configuration may be indicated via MAC-CE using a configuration identifier.

Figure 6:
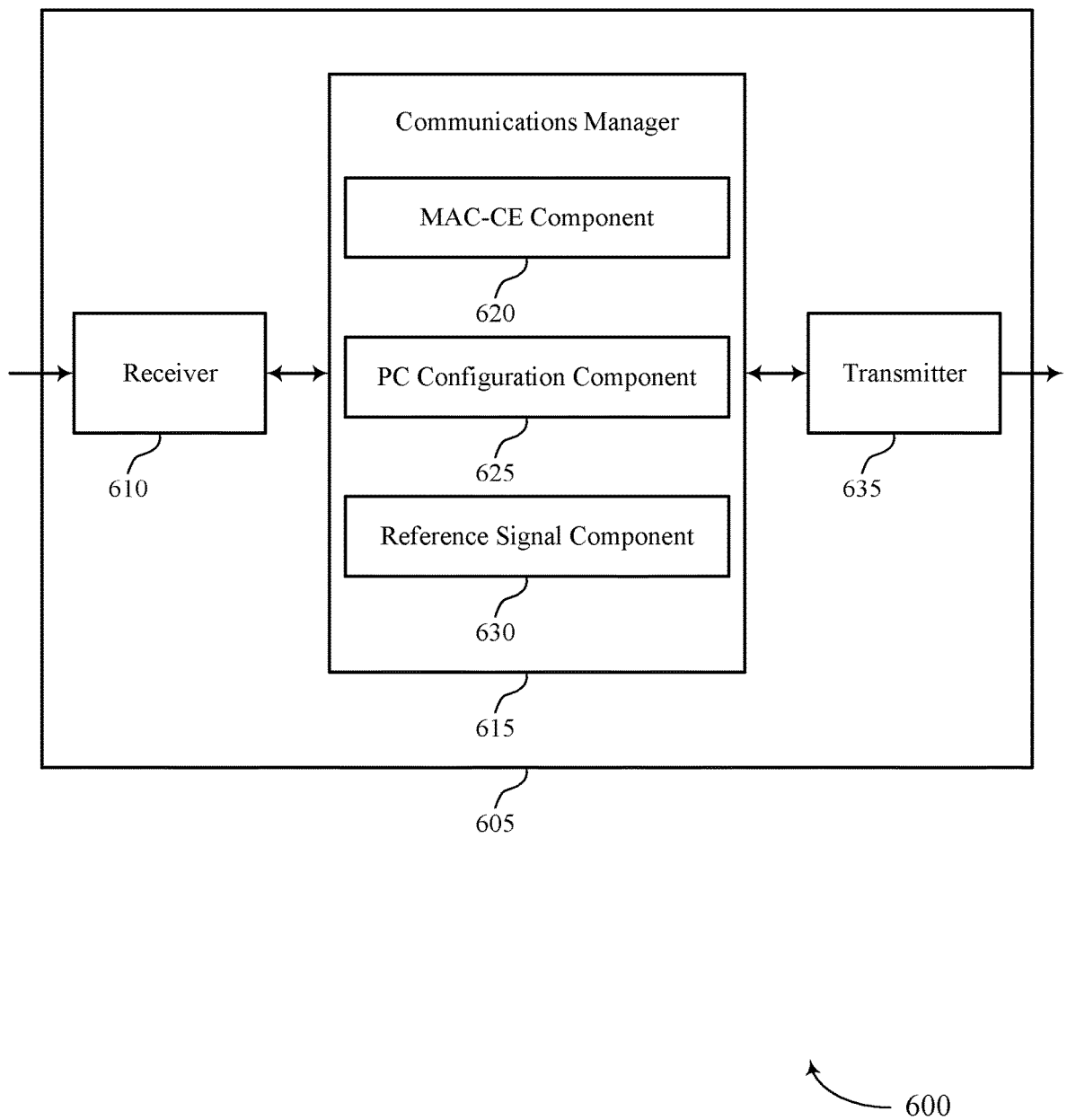

FIG. 6 shows a block diagram 600 of a device 605 in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to uplink power control via MAC-CE messaging, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a MAC-CE component 620, a power control (PC) configuration component 625, and a reference signal component 630. The communications manager 615 may be an example of aspects of the communications manager 810 described herein. The MAC-CE component 620 may receive a medium access control layer control element message including a power control configuration identifier.

The PC configuration component 625 may identify a power control configuration based on the power control configuration identifier, where the power control configuration indicates one or more power control parameters and a path loss reference signal identifier.

The reference signal component 630 may update a path loss reference signal for an uplink transmission from a first reference signal to a second reference signal based on the identified power control configuration.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
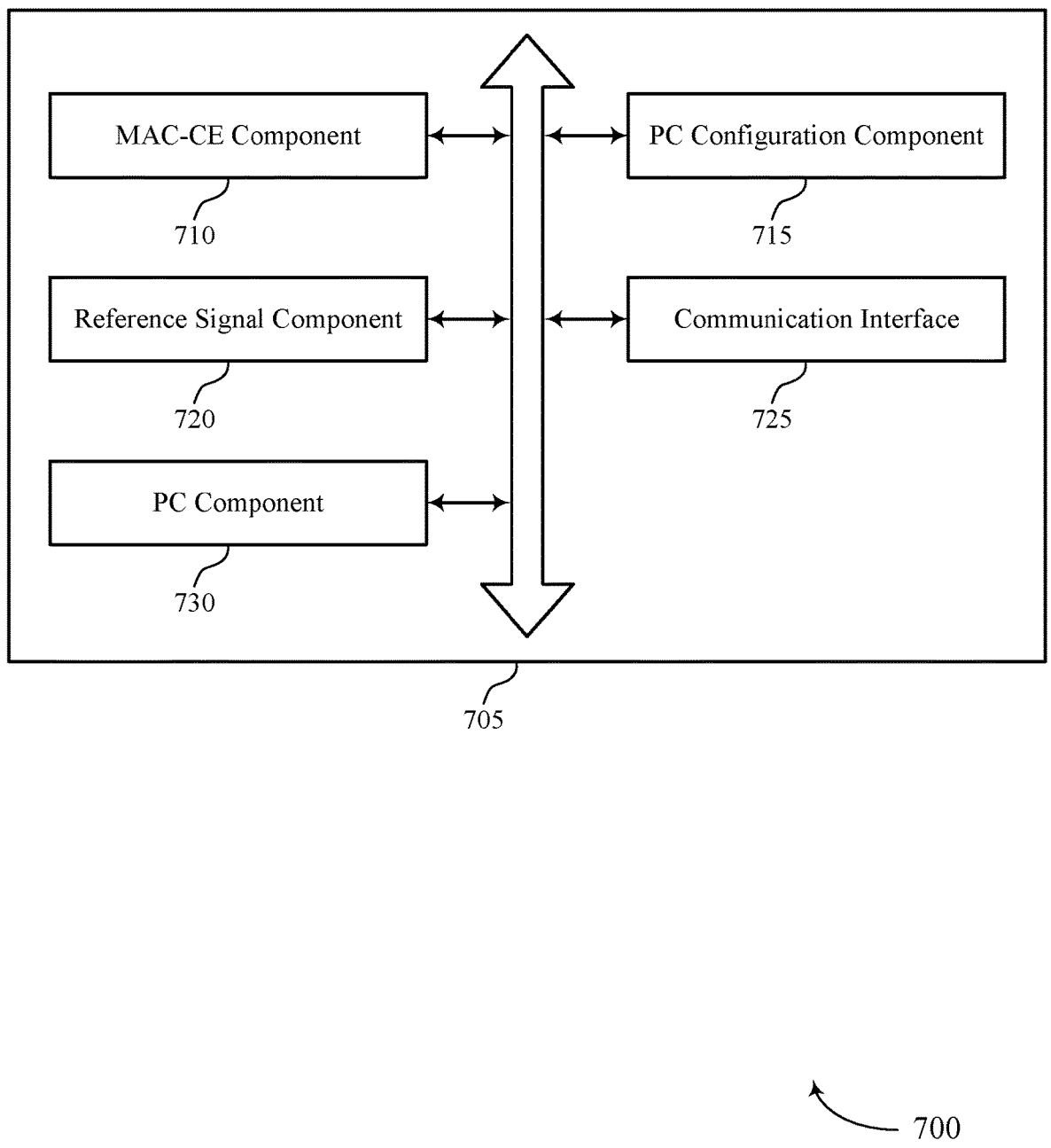
FIG. 7 shows a block diagram of a communications manager in accordance with aspects of the present disclosure.

FIG. 7 shows a block diagram 700 of a communications manager 705 in accordance with aspects of the present disclosure. The communications manager 705 may be an example of aspects of a communications manager 515, a communications manager 615, or a communications manager 810 described herein. The communications manager 705 may include a MAC-CE component 710, a PC configuration component 715, a reference signal component 720, a communication interface 725, and a PC component 730. Each of these modules may communicate, directly or indirectly, with one another (e.g., via one or more buses). The MAC-CE component 710 may receive a medium access control layer control element message including a power control configuration identifier.

In some examples, the MAC-CE component 710 may receive a sequence of power control configuration identifiers in the medium access control layer control element message. In some cases, the medium access control layer control element message indicates a duration of the period of time. In some cases, the power control configuration identifier indicates a physical uplink shared channel configuration.

In some cases, the power control configuration identifier indicates a sounding reference signal resource set configuration. In some cases, the power control configuration identifier indicates a physical uplink control channel spatial relation information configuration.

The PC configuration component 715 may identify a power control configuration based on the power control configuration identifier, where the power control configuration indicates one or more power control parameters and a path loss reference signal identifier. In some examples, the PC configuration component 715 may update the path loss reference signal from the second reference signal to a third reference signal based on the sequence of power control configuration identifiers.

In some examples, the PC configuration component 715 may update the path loss reference signal from the second reference signal to the third reference signal after expiration of a period of time. In some examples, the PC configuration component 715 may receive, from a base station, an indication of a value for at least one of the one or more power control parameters for a set of power control configuration identifiers.

In some cases, the one or more power control parameters include a closed loop index, an alpha set identifier, or a combination thereof. In some cases, the path loss reference signal identifier specifies a synchronization signal block including the second reference signal.

The reference signal component 720 may update a path loss reference signal for an uplink transmission from a first reference signal to a second reference signal based on the identified power control configuration. The communication interface 725 may receive a downlink communication including the second reference signal.

In some examples, the communication interface 725 may perform the uplink transmission using one or more transmit beams, a millimeter wave frequency, or a combination thereof. The PC component 730 may perform one or more measurements of the second reference signal to identify a path loss. In some examples, the PC component 730 may to configure a transmitter to adjust a transmission power for the uplink transmission based on the identified path loss.

Figure 8:
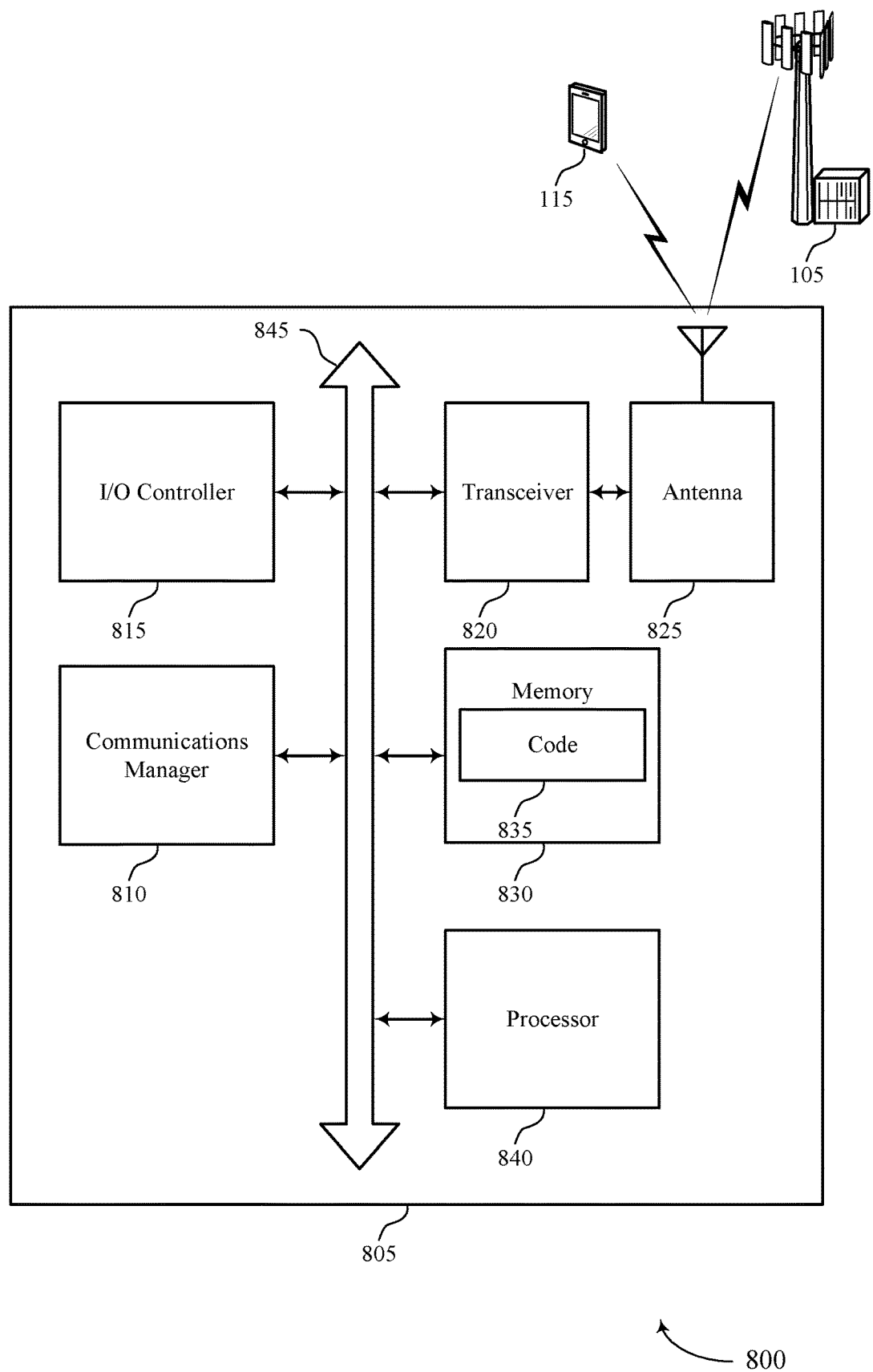
FIG. 8 shows a diagram of a system including a device in accordance with aspects of the present disclosure.

FIG. 8 shows a diagram of a system 800 including a device 805 in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive a medium access control layer control element message including a power control configuration identifier, identify a power control configuration based on the power control configuration identifier, where the power control configuration indicates one or more power control parameters and a path loss reference signal identifier, and update a path loss reference signal for an uplink transmission from a first reference signal to a second reference signal based on the identified power control configuration.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting uplink power control via MAC-CE messaging).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
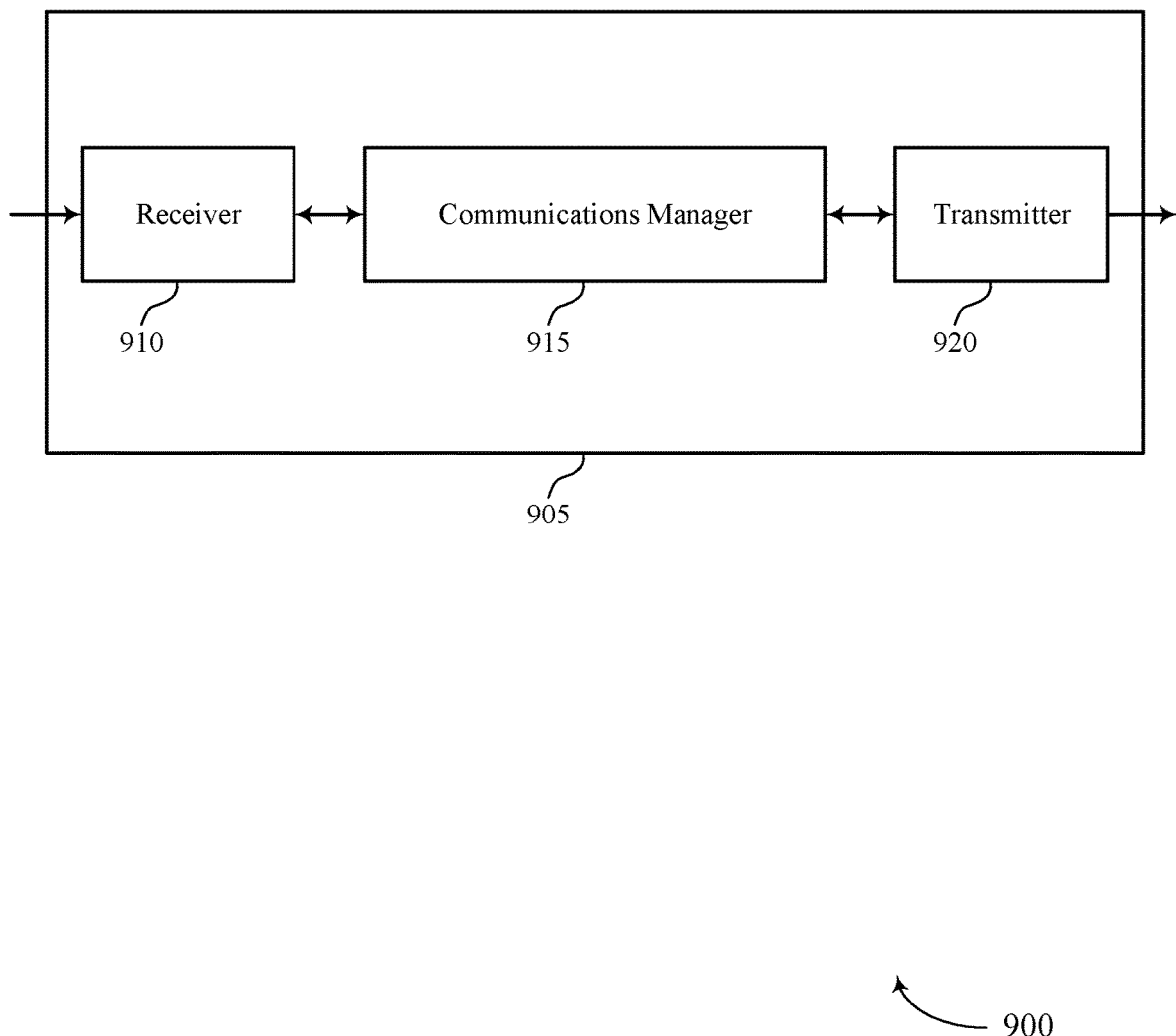
FIGS. 9 and 10 show block diagrams of devices in accordance with aspects of the present disclosure.

FIG. 9 shows a block diagram 900 of a device 905 in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to uplink power control via MAC-CE messaging, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may receive, from a UE, a first uplink transmission having a first received power, determine to update a path loss reference signal for the UE from a first reference signal to a second reference signal based on the first received power, and transmit a medium access control layer control element message to the UE, where the medium access control layer control element message includes a power control configuration identifier that indicates one or more power control parameters and a path loss reference signal identifier for the second reference signal. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
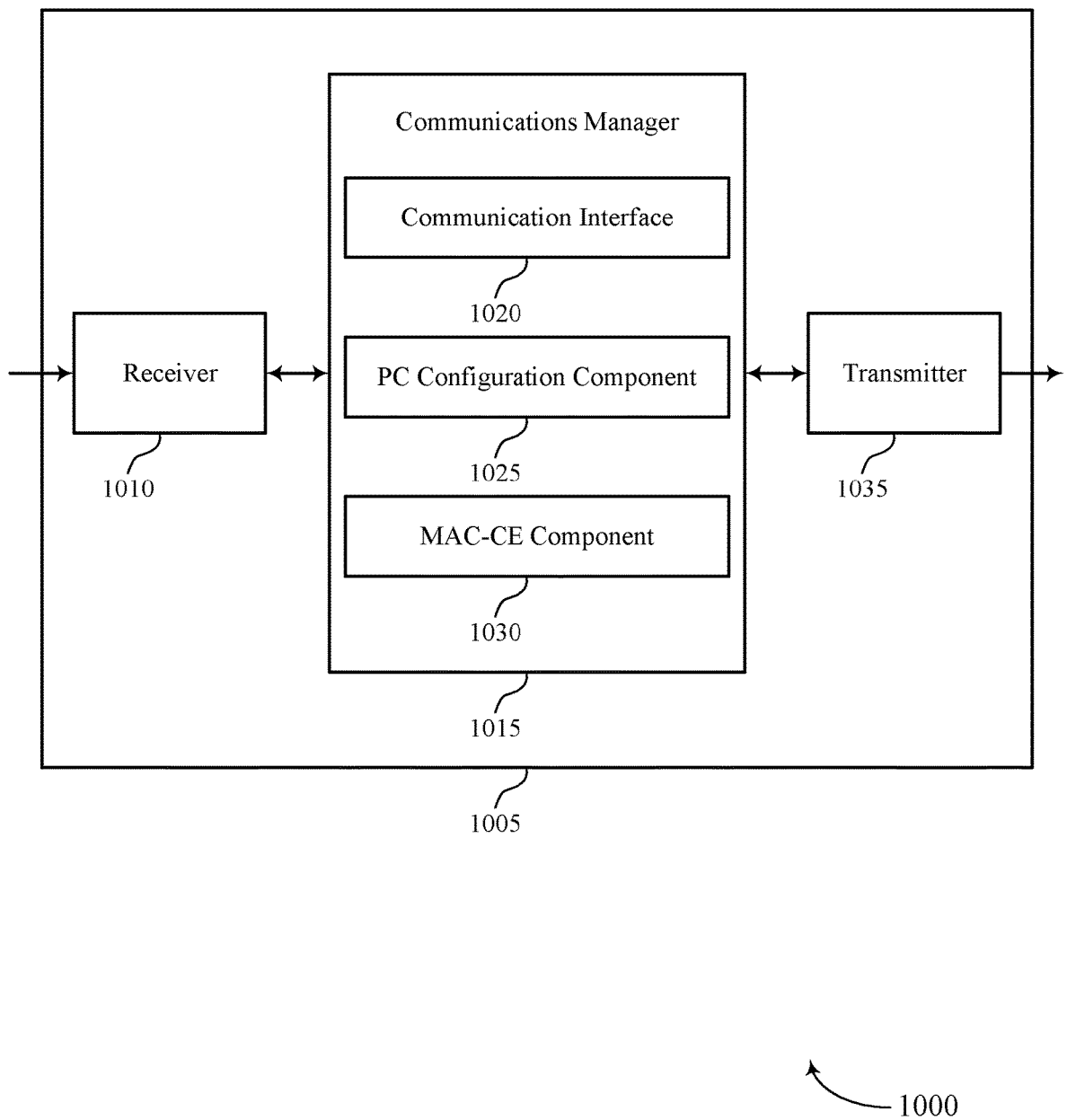

FIG. 10 shows a block diagram 1000 of a device 1005 in accordance with aspects of the present disclosure. The device 1005 may be an example of aspects of a device 905, or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to uplink power control via MAC-CE messaging, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a communication interface 1020, a PC configuration component 1025, and a MAC-CE component 1030. The communications manager 1015 may be an example of aspects of the communications manager 1210 described herein. The communication interface 1020 may receive, from a UE, a first uplink transmission having a first received power. The PC configuration component 1025 may determine to update a path loss reference signal for the UE from a first reference signal to a second reference signal based on the first received power.

The MAC-CE component 1030 may transmit a medium access control layer control element message to the UE, where the medium access control layer control element message includes a power control configuration identifier that indicates one or more power control parameters and a path loss reference signal identifier for the second reference signal.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
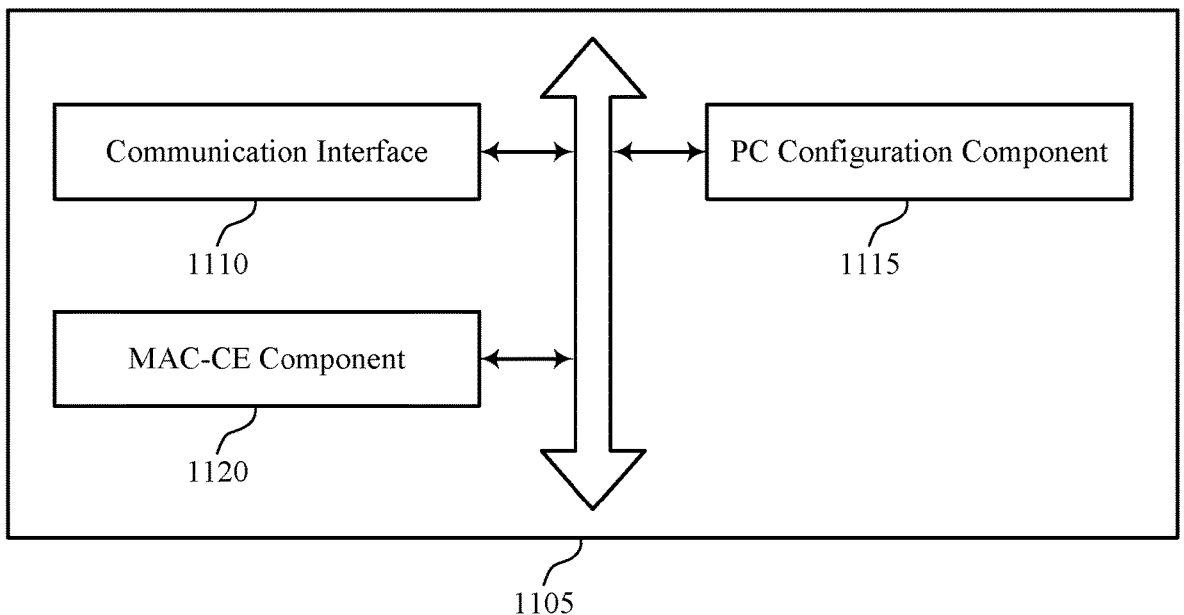
FIG. 11 shows a block diagram of a communications manager in accordance with aspects of the present disclosure.

FIG. 11 shows a block diagram 1100 of a communications manager 1105 in accordance with aspects of the present disclosure. The communications manager 1105 may be an example of aspects of a communications manager 915, a communications manager 1015, or a communications manager 1210 described herein. The communications manager 1105 may include a communication interface 1110, a PC configuration component 1115, and a MAC-CE component 1120. Each of these modules may communicate, directly or indirectly, with one another (e.g., via one or more buses).

The communication interface 1110 may receive, from a UE, a first uplink transmission having a first received power. In some examples, the communication interface 1110 may transmit a downlink communication including the second reference signal.

In some examples, the communication interface 1110 may receive, from the UE, a second uplink transmission having a second received power different from the first received power. In some examples, the communication interface 1110 may receive, from the UE, an uplink transmission using one or more receive beams, a millimeter wave frequency, or a combination thereof.

The PC configuration component 1115 may determine to update a path loss reference signal for the UE from a first reference signal to a second reference signal based on the first received power.

In some examples, the PC configuration component 1115 may transmit, to the UE, an indication of a value for at least one of the one or more power control parameters for a set of power control configuration identifiers. In some cases, the power control configuration identifier indicates a physical uplink shared channel configuration. In some cases, the power control configuration identifier indicates a sounding reference signal resource set configuration.

In some cases, the power control configuration identifier indicates a physical uplink control channel spatial relation information configuration. In some cases, the one or more power control parameters include a closed loop index, an alpha set identifier, or a combination thereof. In some cases, the path loss reference signal identifier specifies a synchronization signal block including the second reference signal.

The MAC-CE component 1120 may transmit a medium access control layer control element message to the UE, where the medium access control layer control element message includes a power control configuration identifier that indicates one or more power control parameters and a path loss reference signal identifier for the second reference signal.

In some examples, the MAC-CE component 1120 may transmit a sequence of power control configuration identifiers in the medium access control layer control element message. In some examples, the MAC-CE component 1120 may transmit a duration of a period of time for updating, by the UE, the path loss reference signal from the second reference signal to a third reference signal after expiration of the period of time, where the duration is transmitted in the medium access control layer message.

Figure 12:
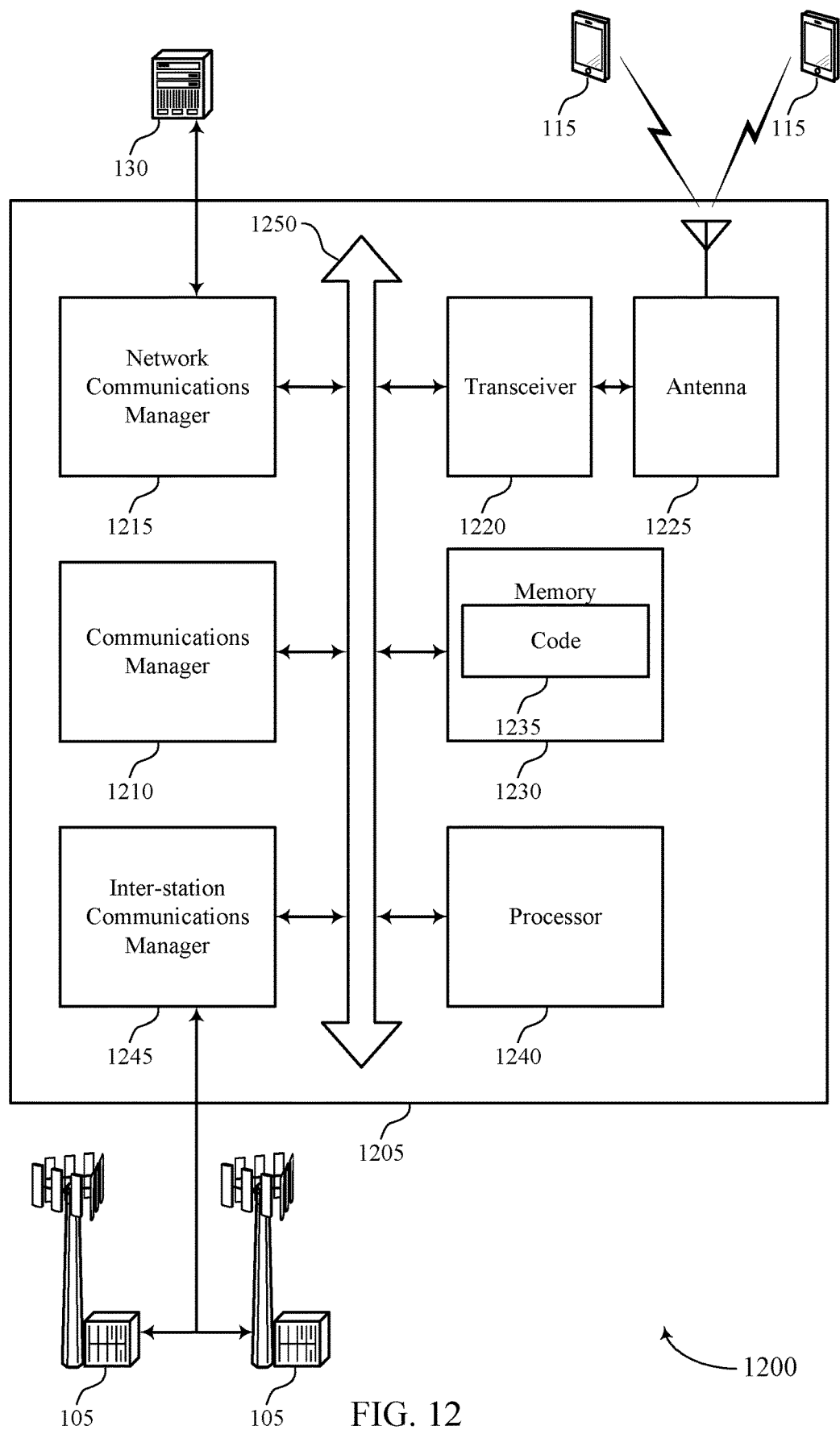
FIG. 12 shows a diagram of a system including a device in accordance with aspects of the present disclosure.

FIG. 12 shows a diagram of a system 1200 including a device 1205 in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may receive, from a UE, a first uplink transmission having a first received power, determine to update a path loss reference signal for the UE from a first reference signal to a second reference signal based on the first received power, and transmit a medium access control layer control element message to the UE, where the medium access control layer control element message includes a power control configuration identifier that indicates one or more power control parameters and a path loss reference signal identifier for the second reference signal.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting uplink power control via MAC-CE messaging).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
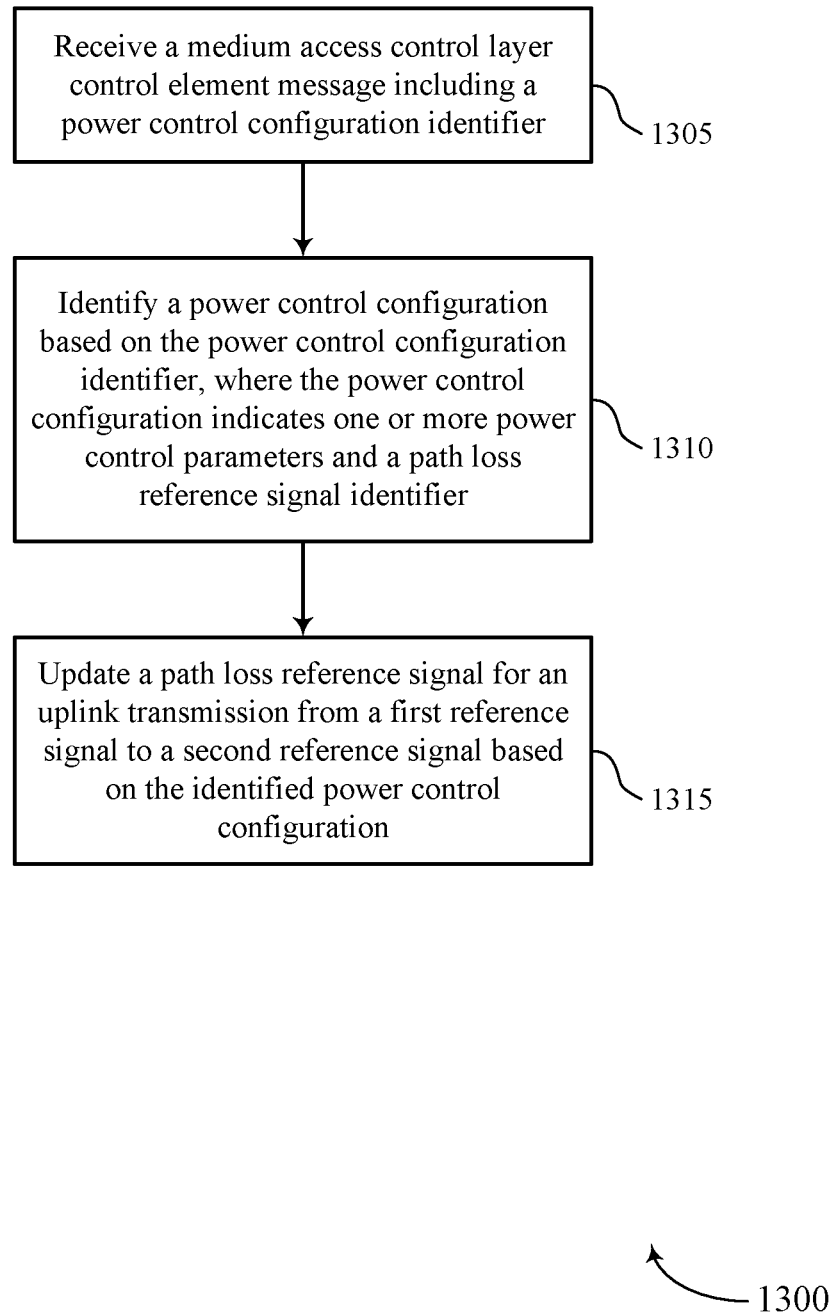
FIGS. 13 through 18 show flowcharts illustrating methods in accordance with aspects of the present disclosure.

FIG. 13 shows a flowchart illustrating a method 1300 in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive a medium access control layer control element message including a power control configuration identifier. The operations of 1305 may be performed according to the methods described herein. In some examples, aspects of the operations of 1305 may be performed by a MAC-CE component as described with reference to FIGS. 5 through 8.

At 1310, the UE may identify a power control configuration based on the power control configuration identifier, where the power control configuration indicates one or more power control parameters and a path loss reference signal identifier. The operations of 1310 may be performed according to the methods described herein. In some examples, aspects of the operations of 1310 may be performed by a PC configuration component as described with reference to FIGS. 5 through 8.

At 1315, the UE may update a path loss reference signal for an uplink transmission from a first reference signal to a second reference signal based on the identified power control configuration. The operations of 1315 may be performed according to the methods described herein. In some examples, aspects of the operations of 1315 may be performed by a reference signal component as described with reference to FIGS. 5 through 8.

Figure 14:
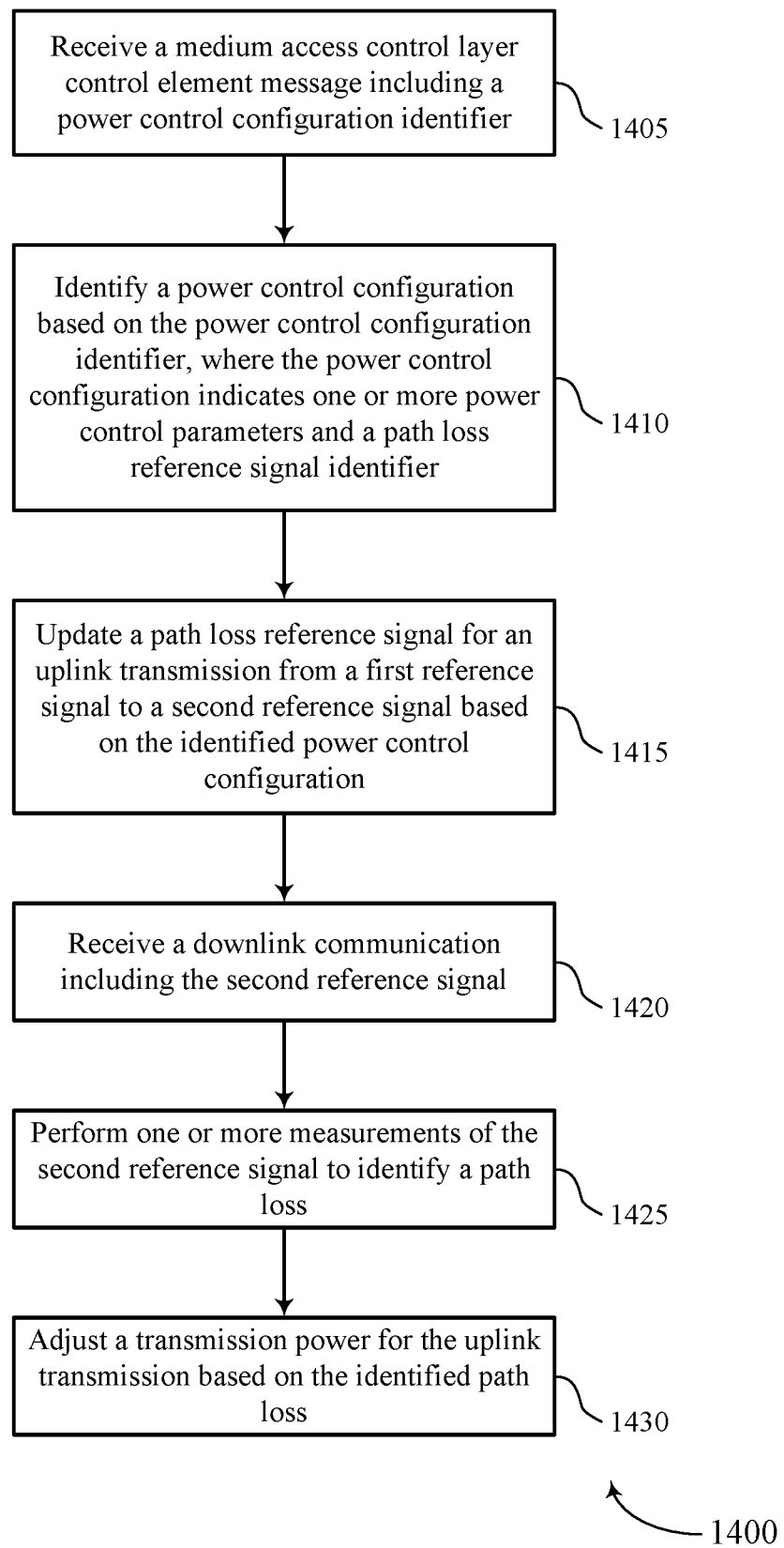

FIG. 14 shows a flowchart illustrating a method 1400 in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may receive a medium access control layer control element message including a power control configuration identifier. The operations of 1405 may be performed according to the methods described herein. In some examples, aspects of the operations of 1405 may be performed by a MAC-CE component as described with reference to FIGS. 5 through 8.

At 1410, the UE may identify a power control configuration based on the power control configuration identifier, where the power control configuration indicates one or more power control parameters and a path loss reference signal identifier. The operations of 1410 may be performed according to the methods described herein. In some examples, aspects of the operations of 1410 may be performed by a PC configuration component as described with reference to FIGS. 5 through 8.

At 1415, the UE may update a path loss reference signal for an uplink transmission from a first reference signal to a second reference signal based on the identified power control configuration. The operations of 1415 may be performed according to the methods described herein. In some examples, aspects of the operations of 1415 may be performed by a reference signal component as described with reference to FIGS. 5 through 8.

At 1420, the UE may receive a downlink communication including the second reference signal. The operations of 1420 may be performed according to the methods described herein. In some examples, aspects of the operations of 1420 may be performed by a communication interface as described with reference to FIGS. 5 through 8.

At 1425, the UE may perform one or more measurements of the second reference signal to identify a path loss. The operations of 1425 may be performed according to the methods described herein. In some examples, aspects of the operations of 1425 may be performed by a PC component as described with reference to FIGS. 5 through 8.

At 1430, the UE may adjust a transmission power for the uplink transmission based on the identified path loss. The operations of 1430 may be performed according to the methods described herein. In some examples, aspects of the operations of 1430 may be performed by a PC component as described with reference to FIGS. 5 through 8.

Figure 15:
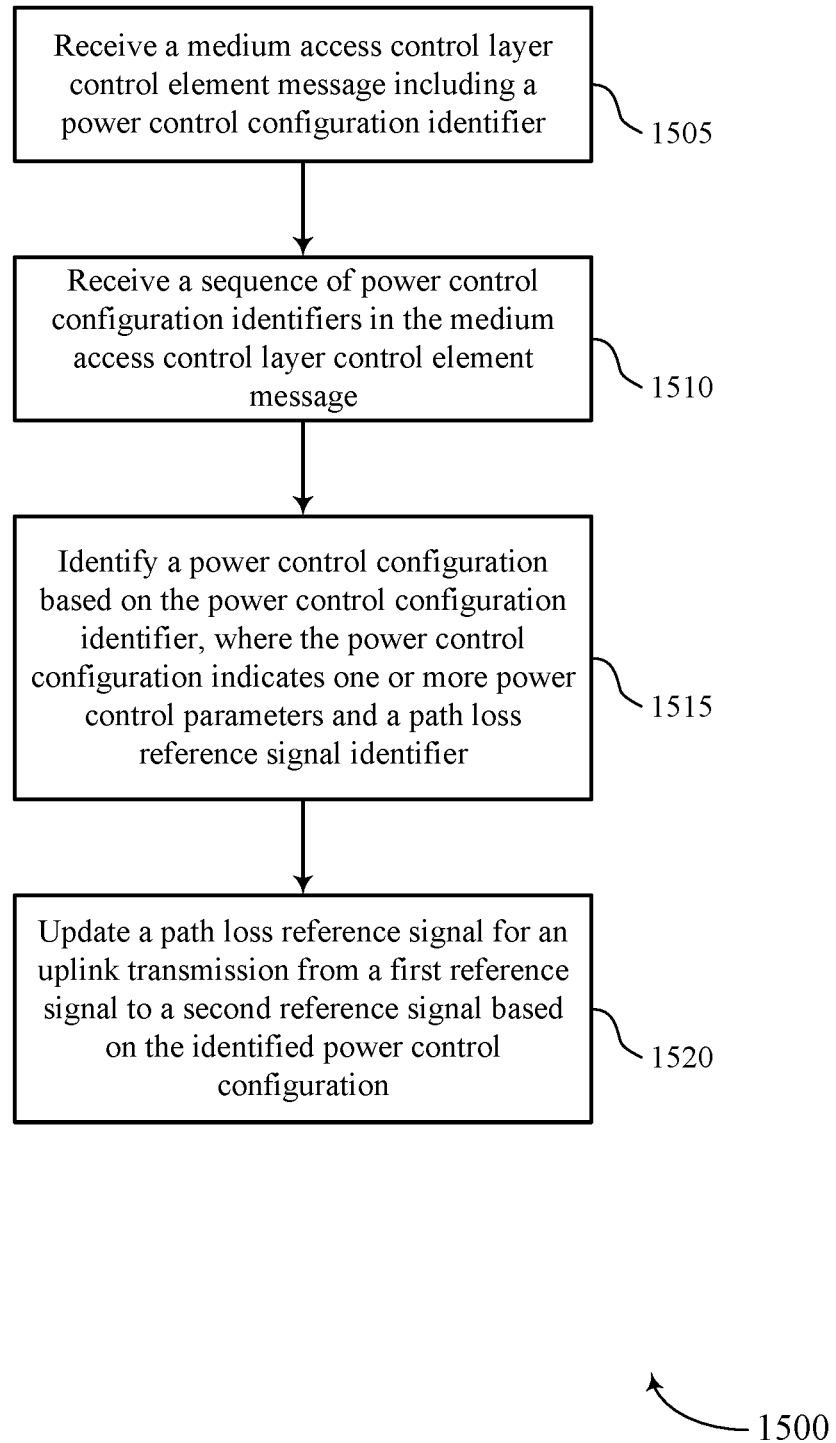

FIG. 15 shows a flowchart illustrating a method 1500 in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may receive a medium access control layer control element message including a power control configuration identifier. The operations of 1505 may be performed according to the methods described herein. In some examples, aspects of the operations of 1505 may be performed by a MAC-CE component as described with reference to FIGS. 5 through 8.

At 1510, the UE may receive a sequence of power control configuration identifiers in the medium access control layer control element message. The operations of 1510 may be performed according to the methods described herein. In some examples, aspects of the operations of 1510 may be performed by a MAC-CE component as described with reference to FIGS. 5 through 8.

At 1515, the UE may identify a power control configuration based on the power control configuration identifier, where the power control configuration indicates one or more power control parameters and a path loss reference signal identifier. The operations of 1515 may be performed according to the methods described herein. In some examples, aspects of the operations of 1515 may be performed by a PC configuration component as described with reference to FIGS. 5 through 8.

At 1520, the UE may update a path loss reference signal for an uplink transmission from a first reference signal to a second reference signal based on the identified power control configuration. The operations of 1520 may be performed according to the methods described herein. In some examples, aspects of the operations of 1520 may be performed by a reference signal component as described with reference to FIGS. 5 through 8.

Figure 16:
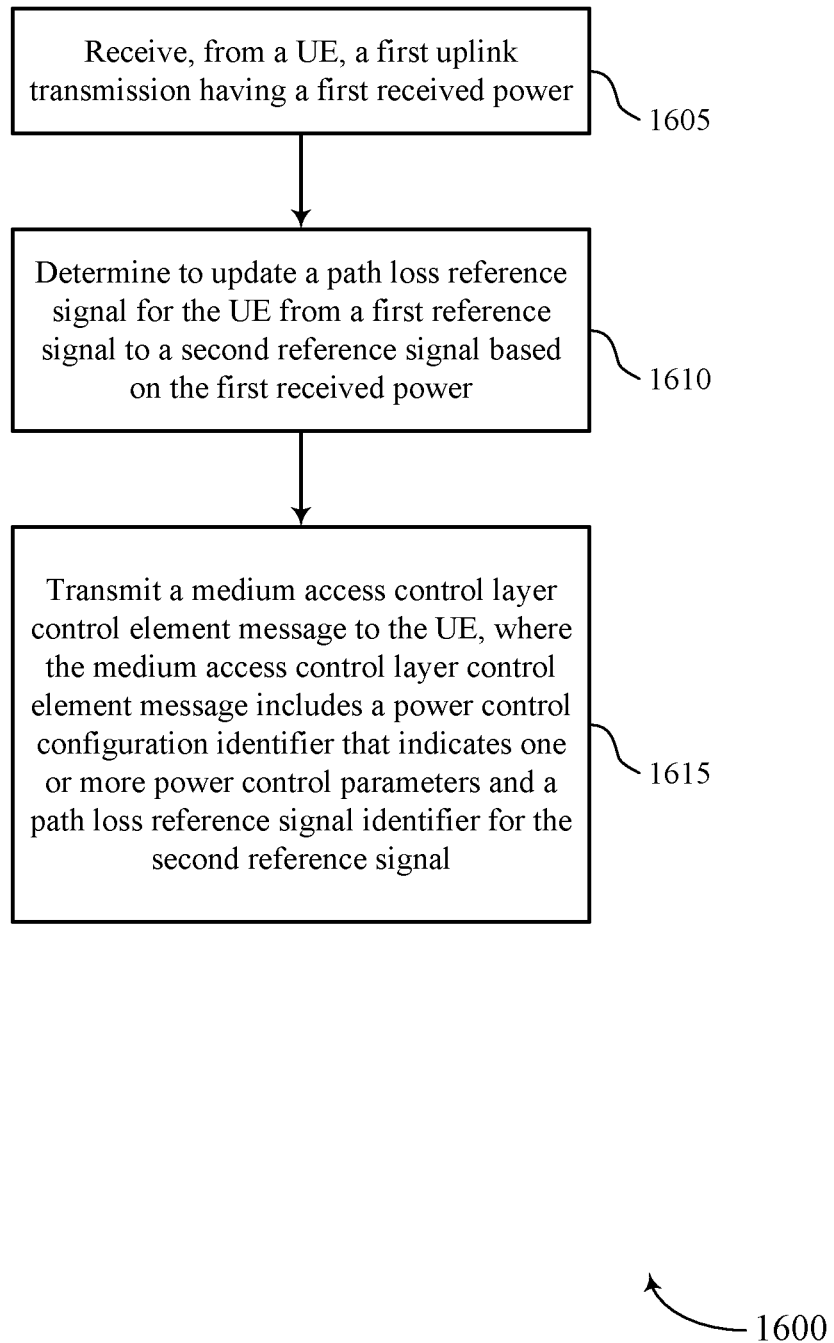

FIG. 16 shows a flowchart illustrating a method 1600 in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may receive, from a UE, a first uplink transmission having a first received power. The operations of 1605 may be performed according to the methods described herein. In some examples, aspects of the operations of 1605 may be performed by a communication interface as described with reference to FIGS. 9 through 12.

At 1610, the base station may determine to update a path loss reference signal for the UE from a first reference signal to a second reference signal based on the first received power. The operations of 1610 may be performed according to the methods described herein. In some examples, aspects of the operations of 1610 may be performed by a PC configuration component as described with reference to FIGS. 9 through 12.

At 1615, the base station may transmit a medium access control layer control element message to the UE, where the medium access control layer control element message includes a power control configuration identifier that indicates one or more power control parameters and a path loss reference signal identifier for the second reference signal. The operations of 1615 may be performed according to the methods described herein. In some examples, aspects of the operations of 1615 may be performed by a MAC-CE component as described with reference to FIGS. 9 through 12.

Figure 17:
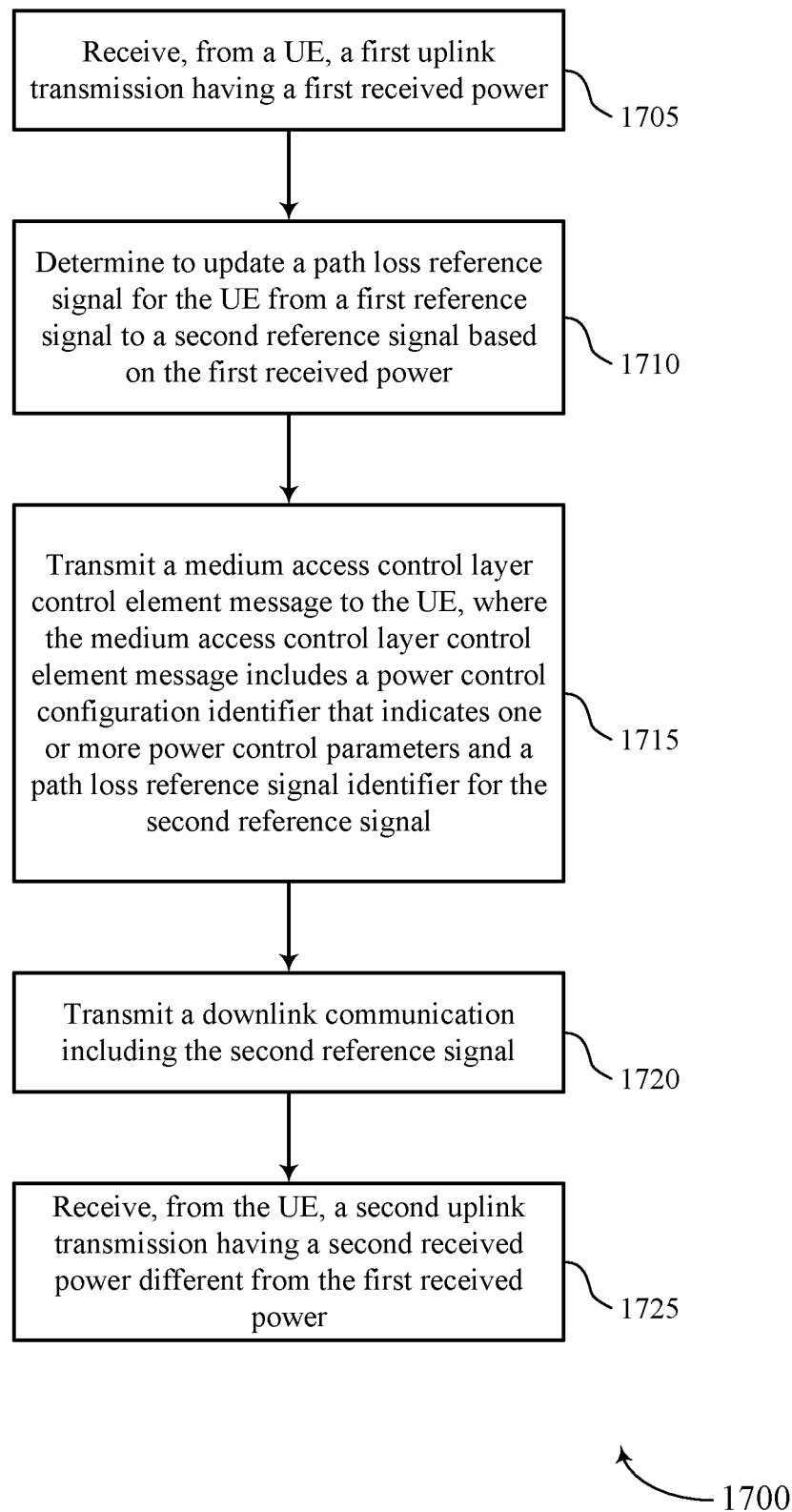

FIG. 17 shows a flowchart illustrating a method 1700 in accordance with aspects of the present disclosure. The operations of method 1700 may be implemented by a base station 105 or its components as described herein. For example, the operations of method 1700 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1705, the base station may receive, from a UE, a first uplink transmission having a first received power. The operations of 1705 may be performed according to the methods described herein. In some examples, aspects of the operations of 1705 may be performed by a communication interface as described with reference to FIGS. 9 through 12.

At 1710, the base station may determine to update a path loss reference signal for the UE from a first reference signal to a second reference signal based on the first received power. The operations of 1710 may be performed according to the methods described herein. In some examples, aspects of the operations of 1710 may be performed by a PC configuration component as described with reference to FIGS. 9 through 12.

At 1715, the base station may transmit a medium access control layer control element message to the UE, where the medium access control layer control element message includes a power control configuration identifier that indicates one or more power control parameters and a path loss reference signal identifier for the second reference signal. The operations of 1715 may be performed according to the methods described herein. In some examples, aspects of the operations of 1715 may be performed by a MAC-CE component as described with reference to FIGS. 9 through 12.

At 1720, the base station may transmit a downlink communication including the second reference signal. The operations of 1720 may be performed according to the methods described herein. In some examples, aspects of the operations of 1720 may be performed by a communication interface as described with reference to FIGS. 9 through 12.

At 1725, the base station may receive, from the UE, a second uplink transmission having a second received power different from the first received power. The operations of 1725 may be performed according to the methods described herein. In some examples, aspects of the operations of 1725 may be performed by a communication interface as described with reference to FIGS. 9 through 12.

Figure 18:
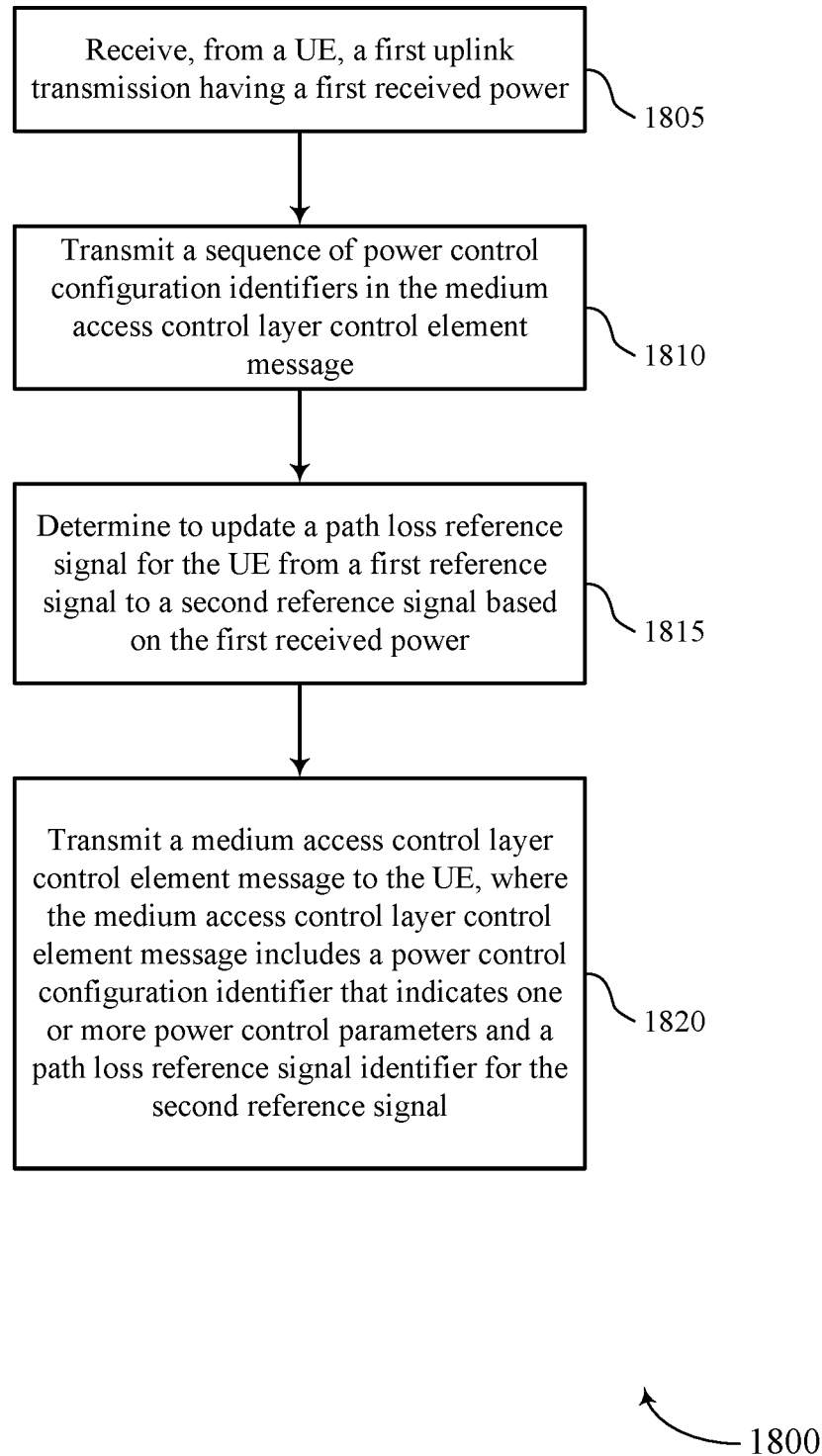

FIG. 18 shows a flowchart illustrating a method 1800 in accordance with aspects of the present disclosure. The operations of method 1800 may be implemented by a base station 105 or its components as described herein. For example, the operations of method 1800 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1805, the base station may receive, from a UE, a first uplink transmission having a first received power. The operations of 1805 may be performed according to the methods described herein. In some examples, aspects of the operations of 1805 may be performed by a communication interface as described with reference to FIGS. 9 through 12.

At 1810, the base station may transmit a sequence of power control configuration identifiers in the medium access control layer control element message. The operations of 1810 may be performed according to the methods described herein. In some examples, aspects of the operations of 1810 may be performed by a MAC-CE component as described with reference to FIGS. 9 through 12.

At 1815, the base station may determine to update a path loss reference signal for the UE from a first reference signal to a second reference signal based on the first received power. The operations of 1815 may be performed according to the methods described herein. In some examples, aspects of the operations of 1815 may be performed by a PC configuration component as described with reference to FIGS. 9 through 12.

At 1820, the base station may transmit a medium access control layer control element message to the UE, where the medium access control layer control element message includes a power control configuration identifier that indicates one or more power control parameters and a path loss reference signal identifier for the second reference signal. The operations of 1820 may be performed according to the methods described herein. In some examples, aspects of the operations of 1820 may be performed by a MAC-CE component as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    receiving a medium access control layer control element message including a sequence of power control configuration identifiers;
    identifying a set of power control configurations based at least in part on the sequence of power control configuration identifiers, wherein each power control configuration of the set indicates one or more power control parameters and a path loss reference signal identifier; and
    updating a path loss reference signal for an uplink transmission from a current reference signal to a next reference signal based at least in part on one of the identified set of power control configurations.

2. The method of claim 1, further comprising:
    receiving a downlink communication including the next reference signal;
    performing one or more measurements of the next reference signal to identify a path loss; and
    adjusting a transmission power for the uplink transmission based at least in part on the identified path loss.

3. The method of claim 1, wherein one of the power control configuration identifiers of the sequence indicates a sounding reference signal resource set configuration.

4. The method of claim 1, wherein one of the power control configuration identifiers of the sequence indicates a physical uplink shared channel configuration.

5. The method of claim 1, further comprising:
    performing the uplink transmission using one or more transmit beams, a millimeter wave frequency, or a combination thereof.

6. The method of claim 1, further comprising:
    receiving an indication of a value for at least one of the one or more power control parameters for a plurality of power control configuration identifiers.

7. The method of claim 1, wherein one of the power control configuration identifiers of the sequence indicates a physical uplink control channel spatial relation information configuration.

8. The method of claim 1, wherein the one or more power control parameters comprise a closed loop index, an alpha set identifier, or a combination thereof.

9. The method of claim 1, wherein the path loss reference signal identifier specifies a synchronization signal block including the next reference signal.

10. The method of claim 1, wherein updating the path loss reference signal for an uplink transmission from the current reference signal to the next reference signal further comprises:

updating the path loss reference signal from the current reference signal to the next reference signal after expiration of a period of time.

11. A method for wireless communications at a network entity, comprising:
receiving, from a user equipment (UE), a first uplink transmission having a first received power;
determining to update a path loss reference signal for the UE from a current reference signal to a next reference signal based at least in part on the first received power; and
transmitting a medium access control layer control element message to the UE, wherein the medium access control layer control element message includes a sequence of power control configuration identifiers that each indicate one or more power control parameters and a path loss reference signal identifier for the next reference signal.

12. The method of claim 11, further comprising:
transmitting a downlink communication including the next reference signal.

13. The method of claim 11, further comprising:
receiving, from the UE, a second uplink transmission having a second received power different from the first received power.

14. The method of claim 11, wherein one of the power control configuration identifiers of the sequence indicates a physical uplink shared channel configuration.

15. The method of claim 11, wherein one of the power control configuration identifiers of the sequence indicates a sounding reference signal resource set configuration.

16. The method of claim 11, further comprising:
receiving, from the UE, an uplink transmission using one or more receive beams, a millimeter wave frequency, or a combination thereof.

17. The method of claim 11, further comprising:
transmitting, to the UE, an indication of a value for at least one of the one or more power control parameters for a plurality of power control configuration identifiers.

18. The method of claim 11, wherein one of the power control configuration identifiers of the sequence indicates a physical uplink control channel spatial relation information configuration.

19. The method of claim 11, wherein the one or more power control parameters comprise a closed loop index, an alpha set identifier, or a combination thereof.

20. The method of claim 11, wherein the path loss reference signal identifier specifies a synchronization signal block including the next reference signal.

21. An apparatus for wireless communications at a user equipment (UE), comprising:
a processor,
memory coupled with the processor; and
instructions stored in the memory and executable by the processor to cause the apparatus to:
receive a medium access control layer control element message including a sequence of power control configuration identifiers;
identify set of power control configurations based at least in part on the sequence of power control configuration identifiers, wherein each power control configuration of the set indicates one or more power control parameters and a path loss reference signal identifier; and
update a path loss reference signal for an uplink transmission from a current reference signal to a next reference signal based at least in part on one of the identified set of power control configurations.

22. The apparatus of claim 21, wherein the instructions are further executable by the processor to cause the apparatus to:
receive a downlink communication including the next reference signal;
perform one or more measurements of the next reference signal to identify a path loss; and
configuring a transmitter to adjust a transmission power for the uplink transmission based at least in part on the identified path loss.

23. The apparatus of claim 21, wherein one of the power control configuration identifiers indicates a sounding reference signal resource set configuration.

24. The apparatus of claim 21, wherein one of the power control configuration identifiers indicates a physical uplink shared channel configuration.

25. The apparatus of claim 21, wherein the instructions are further executable by the processor to cause the apparatus to:
perform the uplink transmission using one or more transmit beams, a millimeter wave frequency, or a combination thereof.

26. The apparatus of claim 21, wherein the instructions are further executable by the processor to cause the apparatus to:
receive an indication of a value for at least one of the one or more power control parameters for a plurality of power control configuration identifiers.

27. The apparatus of claim 21, wherein the one or more power control parameters comprise a closed loop index, an alpha set identifier, or a combination thereof.

28. The apparatus of claim 21, wherein one of the path loss reference signal identifiers specifies a synchronization signal block including the next reference signal.

29. An apparatus for wireless communications at a network entity, comprising:
a processor,
memory coupled with the processor; and
instructions stored in the memory and executable by the processor to cause the apparatus to:
receive, from a user equipment (UE), a first uplink transmission having a first received power;
determine to update a path loss reference signal for the UE from a current reference signal to a next reference signal based at least in part on the first received power; and
transmit a medium access control layer control element message to the UE, wherein the medium access control layer control element message includes a sequence of power control configuration identifiers that each indicate one or more power control parameters and a path loss reference signal identifier for the next reference signal.

30. The apparatus of claim 29, wherein one of the power control configuration identifiers indicates a physical uplink shared channel configuration.

31. The apparatus of claim 29, wherein one of the power control configuration identifiers indicates a sounding reference signal resource set configuration.

* * * * *